(12) United States Patent
Tibah et al.

(10) Patent No.: US 12,122,933 B2
(45) Date of Patent: Oct. 22, 2024

(54) ROOFING MATERIALS HAVING ONE OR MORE POLYMER NETWORKS AND RELATED METHODS

(71) Applicant: BMIC LLC, Dallas, TX (US)

(72) Inventors: Denis Muki Tibah, Waxahachie, TX (US); Ramil Marcelo L. Mercado, Waxahachie, TX (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/355,192

(22) Filed: Jul. 19, 2023

(65) Prior Publication Data

US 2023/0357594 A1 Nov. 9, 2023

Related U.S. Application Data

(63) Continuation of application No. PCT/US2022/037483, filed on Jul. 18, 2022.

(Continued)

(51) Int. Cl.
*E04D 1/22* (2006.01)
*C09D 123/06* (2006.01)
*C09D 133/12* (2006.01)
*C09D 175/04* (2006.01)
*C09D 195/00* (2006.01)

(Continued)

(52) U.S. Cl.
CPC ......... *C09D 175/04* (2013.01); *C09D 123/06* (2013.01); *C09D 133/12* (2013.01); *C09D 195/00* (2013.01); *D06N 3/0022* (2013.01); *D06N 3/0063* (2013.01); *D06N 3/045* (2013.01); *D06N 3/142* (2013.01); *D06N 5/003* (2013.01); *E04D 1/22* (2013.01); *D06N 2201/082* (2013.01); *D06N 2203/042* (2013.01);

(Continued)

(58) Field of Classification Search
CPC .. C09D 175/04; C09D 123/06; C09D 133/12; C09D 195/00; D06N 3/0022; D06N 3/0063; D06N 3/045; D06N 3/142; D06N 5/003; D06N 2201/082; D06N 2203/042; D06N 2203/068; D06N 2209/103; D06N 2211/06; E04D 1/22
See application file for complete search history.

(56) References Cited

U.S. PATENT DOCUMENTS 6,538,060 B2 3/2003 Rajalingam et al.
7,803,867 B2 9/2010 Hanrahan et al.
(Continued)

FOREIGN PATENT DOCUMENTS

EP 2277961 A1 1/2011
JP 5882893 B2 3/2016

*Primary Examiner* — Phi D A
(74) *Attorney, Agent, or Firm* — GREENBERG TRAURIG, LLP

(57) ABSTRACT

Some embodiments relate to a roofing material. The roofing material comprises a substrate, and a coating on the substrate. The coating comprises at least a polymer A, a polymer B, and at least one filler. The polymer A, the polymer B, the at least one filler are present in an amount sufficient to result in the coating having: A) a Tear CD property of at least 1000 g-f; and B) at least one of an interpenetrating polymer network, a semi-interpenetrating polymer network, or any combination thereof. Other embodiments relate to additional roofing materials, methods for preparing roofing materials, and the like.

20 Claims, 8 Drawing Sheets

Related U.S. Application Data

(60) Provisional application No. 63/281,304, filed on Nov. 19, 2021, provisional application No. 63/222,651, filed on Jul. 16, 2021.

(51) Int. Cl.
  *D06N 3/00* (2006.01)
  *D06N 3/04* (2006.01)
  *D06N 3/14* (2006.01)
  *D06N 5/00* (2006.01)

(52) U.S. Cl.
  CPC . *D06N 2203/068* (2013.01); *D06N 2209/103* (2013.01); *D06N 2211/06* (2013.01)

(56) References Cited

U.S. PATENT DOCUMENTS

| | | | |
|---|---|---|---|
| 8,231,943 B2 | 7/2012 | Perez et al. | |
| 9,394,464 B2 | 7/2016 | Wiercinski et al. | |
| 2001/0055680 A1* | 12/2001 | Kiik | E04D 5/10 428/354 |
| 2002/0114940 A1* | 8/2002 | Clemens | B05D 7/148 427/407.1 |
| 2004/0019142 A1* | 1/2004 | Rink | C08G 18/4063 524/377 |
| 2004/0235379 A1* | 11/2004 | Ahluwalia | B32B 15/20 442/59 |
| 2006/0241219 A1* | 10/2006 | Wilke | C08G 18/807 524/507 |
| 2008/0160318 A1* | 7/2008 | Senkfor | C08G 18/765 428/423.1 |
| 2010/0048752 A1 | 2/2010 | Vignola et al. | |
| 2012/0291373 A1* | 11/2012 | Ewing | E04D 1/20 252/586 |
| 2015/0105494 A1* | 4/2015 | Naidoo | C08L 95/00 523/438 |
| 2015/0337086 A1* | 11/2015 | Engelbrecht | C09D 175/04 523/436 |
| 2019/0186144 A1* | 6/2019 | LaTorre | E04D 1/28 |
| 2020/0181020 A1* | 6/2020 | Faeth | E04D 1/22 |
| 2021/0002485 A1 | 1/2021 | Smith et al. | |
| 2021/0214944 A1* | 7/2021 | Verhoff | B32B 7/06 |
| 2022/0017749 A1* | 1/2022 | Vincent | D06N 5/003 |
| 2022/0403570 A1* | 12/2022 | Wang | D04H 1/4218 |

* cited by examiner

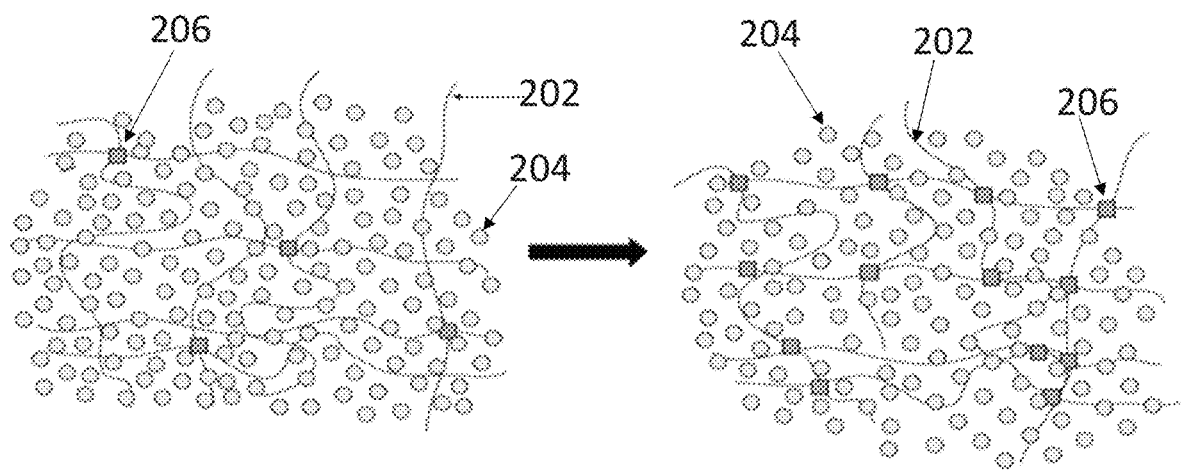
*FIG. 2A*  *FIG. 2B*

ROOFING MATERIALS HAVING ONE OR MORE POLYMER NETWORKS AND RELATED METHODS

CROSS-REFERENCE TO RELATED APPLICATIONS

This application is a continuation of International Application No. PCT/US2022/037483, filed Jul. 18, 2022, and titled "ROOFING MATERIALS HAVING ONE OR MORE POLYMER NETWORKS AND RELATED METHODS," which claims priority to and the benefit of U.S. Provisional Patent Application No. 63/222,651, filed Jul. 16, 2021, and titled "ROOFING MATERIALS HAVING ONE OR MORE POLYMER NETWORKS AND RELATED METHODS"; U.S. Provisional Patent Application No. 63/281,304, filed Nov. 19, 2021, and titled "ROOFING MATERIALS HAVING ONE OR MORE POLYMER NETWORKS AND RELATED METHODS"; the disclosures of which applications are hereby incorporated herein by reference in their entireties.

FIELD

This disclosure generally relates to roofing materials having one or more polymer networks and related methods.

BACKGROUND

Reactive components are typically used less frequently in the preparation of roofing materials due to difficulties in obtaining reaction products having properties suitable for use as roofing materials.

SUMMARY

Some embodiments relate to a roofing material. In some embodiments, the roofing material comprises a substrate and a coating on the substrate. In some embodiments, the coating comprises 5% to 98% by weight of at least a polymer A and a polymer B based on a total weight of the coating, and 2% to 95% by weight of at least one filler based on the total weight of the coating. In some embodiments, the polymer A and the polymer B are different. In some embodiments, the coating having A) a Tear CD property of at least 1000 g-f, as measured according to ASTM D1922, as modified by ASTM D228, and B) at least one of an interpenetrating polymer network, a semi-interpenetrating polymer network, or any combination thereof.

In some embodiments, the substrate does not comprise a metal.

In some embodiments, the coating further comprises asphalt.

In some embodiments, the coating comprises 5% or less by weight of asphalt based on the total weight of the coating.

In some embodiments, the coating does not comprise asphalt.

In some embodiments, the coating comprises 20% to 80% by weight of the polymer A and the polymer B based on the total weight of the coating.

In some embodiments, the coating comprises 40% to 80% by weight of the at least one filler based on the total weight of the coating.

In some embodiments, each of the polymer A and the polymer B independently comprise a polyurethane, an epoxy, a vinyl polymer, an acrylic polymer, a polyisobutylene, an amorphous poly-alpha olefin, a polyolefin, a silicone, a hydrocarbon oil, a resin, or any combination thereof.

In some embodiments, the polymer A, the polymer B, or any combination thereof comprises an unreacted polymer having crosslinkable polymer chains which are not crosslinked.

In some embodiments, the polymer A, the polymer B, or any combination thereof comprises a reacted polymer having crosslinked polymer chains.

In some embodiments, the polymer A, the polymer B, or any combination thereof comprises a reacted polymer having crosslinked polymer chains and an unreacted polymer having crosslinkable polymer chains which are not crosslinked.

In some embodiments, the at least one filler comprises at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled rubber tires, recycled shingles, recycled thermoplastic resins, basalt, roofing granules, graphite, or clay.

In some embodiments, the at least one filler further comprises 0.1% to 49% by weight of asphalt based on a total weight of the at least one filler.

In some embodiments, the roofing material further comprises a plurality of granules on a surface of the coating.

Some embodiments relate to a roofing shingle comprising the roofing materials disclosed herein.

Some embodiments relate to a roofing shingle. In some embodiments, the roofing shingle comprises a substrate and a coating on the substrate. In some embodiments, the coating comprises a polymer A and a polymer B, and at least one filler. In some embodiments, the polymer A and the polymer B are different. In some embodiments, the polymer A, the polymer B, and the at least one filler are present in an amount sufficient to result in the coating having A) a Tear CD property of at least 1000 g-f, as measured according to ASTM D1922, as modified by ASTM D228; and B) at least one of an interpenetrating polymer network, a semi-interpenetrating polymer network, or any combination thereof.

In some embodiments, the substrate does not comprise a metal.

In some embodiments, the coating further comprises asphalt.

In some embodiments, the coating comprises 5% or less by weight of asphalt based on a total weight of the coating.

In some embodiments, the coating does not comprise asphalt.

In some embodiments, the coating comprises 20% to 80% by weight of the polymer A and the polymer B based on a total weight of the coating.

In some embodiments, the coating comprises 40% to 80% by weight of the at least one filler based on a total weight of the coating.

In some embodiments, each of the polymer A and the polymer B independently comprise a polyurethane, an epoxy, a vinyl polymer, an acrylic polymer, a polyisobutylene, an amorphous poly-alpha olefin, a polyolefin, a silicone, a hydrocarbon oil, a resin, or any combination thereof.

In some embodiments, the polymer A, the polymer B, or any combination thereof comprises an unreacted polymer having crosslinkable polymer chains which are not crosslinked.

In some embodiments, the polymer A, the polymer B, or any combination thereof comprises a reacted polymer having crosslinked polymer chains.

In some embodiments, the polymer A, the polymer B, or any combination thereof comprises a reacted polymer having crosslinked polymer chains and an unreacted polymer having crosslinkable polymer chains which are not crosslinked.

In some embodiments, the at least one filler comprises at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled rubber tires, recycled shingles, recycled thermoplastic resins, basalt, roofing granules, graphite, or clay.

In some embodiments, the at least one filler comprises 0.1% to 49% by weight of asphalt based on a total weight of the at least one filler.

In some embodiments, the roofing shingle further comprises a plurality of granules on a surface of the coating.

Some embodiments relate to a method for preparing a roofing material. In some embodiments, the method comprises obtaining a polymeric material A; obtaining a polymeric material B; obtaining at least one filler; and obtaining at least one crosslinking agent. In some embodiments, the polymeric material A, the polymeric material B, the at least one filler, and at least one crosslinking agent are mixed to form a flowable material. In some embodiments, the flowable material is applied to a roofing substrate. In some embodiments, the flowable material is cured to obtain a coating on the roofing substrate. In some embodiments, the coating having at least one of an interpenetrating polymer network, a semi-interpenetrating polymer network, or any combination thereof.

In some embodiments, the mixing is performed in a single tank.

In some embodiments, the flowable material having a viscosity of 50000 cP or less.

In some embodiments, the curing is sufficient for the at least one crosslinking agent to react with at least one of the polymeric material A or the polymeric material B.

In some embodiments, the curing comprises a curing period of at least 5 min.

In some embodiments, the curing comprises exposing the flowable material to ambient conditions.

In some embodiments, the curing comprises exposing the flowable material to at least one of moisture, heat, radiation, or any combination thereof.

In some embodiments, the curing comprises exposing the flowable material to a curing temperature.

In some embodiments, the curing comprises exposing the flowable material to ultraviolet light.

In some embodiments, at least one of the mixing, the applying, or the curing is performed at a temperature of less than 400° F.

In some embodiments, the method further comprises obtaining asphalt, wherein the mixing further comprises mixing the asphalt with the polymeric material A, the polymeric material B, the at least one filler, and the at least one crosslinking agent.

BRIEF DESCRIPTION OF THE DRAWINGS

Reference is made to the drawings that form a part of this disclosure, and which illustrate embodiments in which the materials and methods described herein can be practiced.

FIGS. 2A-2B are schematic diagrams of a polymeric network (2A) before and (2B) after curing, according to some embodiments.

DETAILED DESCRIPTION

Figure 1A:
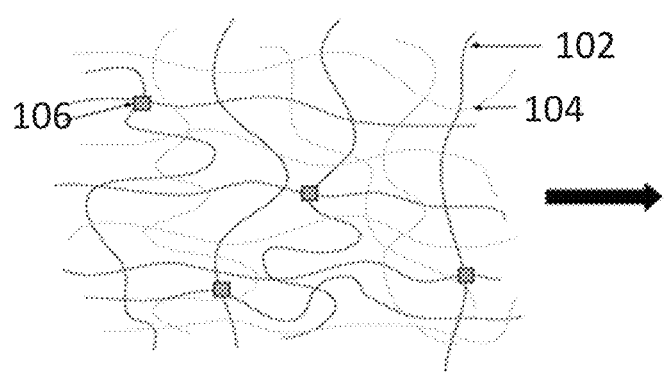
FIGS. 1A-1B are schematic diagrams of a polymeric network (1A) before and (1B) after curing, according to some embodiments.

Some embodiments of the present disclosure relate to coatings having one or more polymer networks for roofing materials and related methods.

As used herein, the term "roofing material" includes, without limitation, shingles, granules, waterproofing membranes, underlayment, tiles, slabs, or any combination thereof. For example, in some embodiments, the roofing material may comprise, consist of, or consist essentially of a roofing shingle. In some embodiments, the roofing shingle may comprise, consist of, or consist essentially of at least one of an asphaltic roofing shingle (e.g., a shingle or a coating disposed on a shingle comprising 0.1% to 49% by weight of asphalt), a non-asphaltic roofing shingle (e.g., a shingle or a coating disposed on a shingle comprising 0% by weight of asphalt), or any combination thereof.

In some embodiments, a roofing material may be provided. In some embodiments, the roofing material may comprise, consist of, or consist essentially of, a roofing shingle.

In some embodiments, the roofing material may comprise, consist of, or consist essentially of a substrate, and a coating on the substrate.

In some embodiments, the substrate may comprise, consist of, or consist essentially of at least one of a plywood substrate, a glass substrate, a cellulosic substrate, a shingle, a scrim, a fabric, a glass mat, a fiberglass mat, an underlayment, a roofing membrane, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof. In some embodiments, the substrate comprises asphalt. In some embodiments, the substrate does not comprise asphalt (e.g., 0% by weight of asphalt based on a total weight of the substrate). In some embodiments, the substrate does not comprise a metal. In some embodiments, the substrate does not comprise glass. In some embodiments, the substrate does not comprise cement. In some embodiments, the substrate is a roofing substrate.

In some embodiments, the coating may comprise, consist of, or consist essentially of at least one of a polymer A, a polymer B, at least one filler, or any combination thereof.

In some embodiments, each of the polymer A and the polymer B may independently comprise, consist of, or consist essentially of at least one of a polyurethane, an epoxy, a vinyl polymer, an acrylic polymer, a polyisobutylene, an amorphous poly-alpha olefin, a polyolefin, a silicone, a hydrocarbon oil, a resin, or any combination thereof. In some embodiments, the polymer A and the polymer B may be different.

Some non-limiting examples of polymers that may be used as the polymer A and the polymer B may include, without limitation, one or more of the following: polyethylenes (PE) (e.g., including, without limitation, one or more of raw low density polyethylene, recycled low density polyethylene (LDPE), linear low density polyethylene (LLDPE), and high density polyethylene (HDPE), an amorphous polyethylene), polypropylene (PP) (e.g., including, without limitation, one or more of isotactic polypropylene (IPP), atactic polypropylene/isotactic propylene (APP/IPP)), polystyrene, polyurethane (PU/TPU), polyurea, terpolymers (e.g., including, without limitation, a functionalized polymer with a reactive oxygen group), amorphous polyalpha olefins (APAO), amorphous polyolefins (APO), (e.g., including, without limitation, one or more of propylene homopolymers, copolymers of propylene and ethylene, copolymers of ethylene alpha-olefin, such as ethylene and 1-octene, ethylene and 1-hexene, and ethylene and 1-butene), polyolefin elastomers (POE), styrene/styrenic block copolymers (e.g., including, without limitation, one or more of styrenic block copolymers with a hydrogenated midblock of styrene-ethylene/butylene-styrene (SEBS), styrene-ethylene/propylene-styrene (SEPS), styrene-isoprene-styrene block copolymers (SIS), and styrene-butadiene-styrene block copolymers (SBS)), ethylene vinyl acetate (EVA), polyisobutylene, polybutadiene, oxidized polyethylene, epoxy thermoplastics, raw polyvinyl butyral (PVB), recycled polyvinyl butyral (rPVB), polyvinyl acetate (PVAC), poly(vinyl butyrate), poly(vinyl propionate), poly(vinyl formate), copolymers of PVAC (e.g., including, without limitation, copolymers of PVAC and EVA); acrylic polymers, such as polymethyl methacrylate; Vistamaxx® 6102 and Vistamaxx® 8880, which are polypropylenes (e.g., isotactic polypropylene (IPP)) and which are available from Exxon-Mobil, Irving, Tex.; Elvaloy®, which is a terpolymer and which is available from Dow/DuPont, Wilmington, Del.; Fusabond®, which is a chemically modified ethylene acrylate copolymer, a modified polyethylene, or a combination thereof and which is available from Dow/DuPont, Wilmington, Del.; RT2304, which is an amorphous polyalpha olefin (APAO) and which is available from Rextac APAO Polymers LLC, Odessa, Tex.; Eastoflex® P1023, which is an amorphous polyolefin (APO) comprising a propylene homopolymer and which is available from Eastman Chemical Company, Kingsport, Tenn.; Eastoflex® E1060, which is an amorphous polyolefin (APO) comprising a copolymer of propylene and ethylene and which is available from Eastman Chemical Company, Kingsport, Tenn.; Eastoflex® M1025, which is an amorphous polyolefin (APO) that comprises a blend of propylene homopolymer and copolymers of propylene and ethylene and which is available from Eastman Chemical Company, Kingsport, Tenn.; Engage® 7487, which is a polyolefin elastomer (POE) and which is available from Dow Inc., Midland, Mich.; SEBS 1657, which is a linear triblock copolymer based on styrene and ethylene/butylene, namely, styrene-ethylene/butylene-styrene (SEBS) and which is available Kraton™ Corporation, Houston, Tex.; D0243, D0246, D1101, D1102, D1116, D1118, D1152, D1155, D1157, D1184, D1189, D1191, and D1194, which are styrene butadiene styrene block copolymers comprising blocks of styrene and butadiene and which is available Kraton™ Corporation, Houston, Tex.; PI131350, which is a polyisobutylene and which is available from TPC Group, Houston, Tex.; ethylene bis stearamide (EBS), which is available from ACME-Hardesty Company, Blue Bell, Pa.; IPP, which is available from Bay Polymer Corp., Fremont, Calif.; recycled low density polyethylene, which is available from Avangard Innovative, Houston, Tex.; hydrocarbon oils, such as, for example, and without limitation, one or more of the following: Kendex® 0897, Kendex® 0898, Kendex® 0834, Kendex® 0060HT, Kendex® 0150H, Kendex® 0150, Kendex® 0847, Kendex® 0070, Kendex® 0100, Kendex® 0200, Kendex® 0250, Kendex® 0300, Kendex® 0325 D, Kendex® 0500, Kendex® 0600, Kendex® 0842, Kendex® 0846, Kendex® 0866, Kendex® MNE, Kendex® CAT, which are available from American Refining Group, Inc., Bradford, Pa.; Nynas Oil (Nyflex-223), which is available from Nynas AB, Stockholm, Sweden; Hyprene Process Oils, which are available from Ergon, Inc., Jackson, Miss.; Hydrolene H600T, which is available from Holly Frontier, Plymouth Meeting, Pa.; Exxon Evlast C 30, Exxon Evlast D 50, and Exxon UmPAO 65, which are available from ExxonMobil, Irving, Tex.; and ethylene bis-stearamide (CAS #110-30-5), which is available from several suppliers, including, for example and without limitation, Acme-Hardesty, Blue Bell, Pa., among others; re-refined engine oil bottoms (REOB) products or vacuum tower asphalt extender products available from several suppliers, including, for example and without limitation, Safety-Kleen, Richardson, Tex.; Vertex Energy, Houston, Tex.; Universal Environmental Services (UES), Peachtree City, Ga.; resins such as, for example, and without limitation, one or more of the following: SYLVACOTE™ 4981, SYLVACOTE™ 4984, SYLVACOTE™ 4985, SYLVACOTE™ 4995, SYLVACOTE™ 7003, SYLVACOTE™ 7097, which are available from Kraton, Houston, Tex.; WestRez® 5010; WestRez® 5040; WestRez® 5090; WestRez® 5092; WestRez® 5300; WestRez® 5101; WestRez® 5105; WestRez® 5110; WestRez® 5120; WestRez® 5140; WestRez® 5185; WestRez® 5295; WestRez® 5205; WestRez® 5206; WestRez® 5215; WestRez® 5230, which are available from Ingevity, North Charleston, S. Carolina.; Dertoline DEG 2, which is a diethylene glycol-esterified rosin, Dertoline G2L, which is a deodorized and stabilized glycerin-esterified rosin, Dertoline MG 105, which is a glycerol ester of maleic rosin, Dertoline P 105, which is a stabilized pentaerythritol-esterified rosin, Dertoline PLS, which is a deodorized and highly stabilized pentaerythritol-esterified rosin, Dertopoline G, which is a glycerin-esterified polymerized rosin, Dertopoline P 125, which is a pentaerythritol-esterified polymerized rosin, Granolite P 118, which is a pentaerythritol-esterified rosin, and Polygral, which is a polymerized gem rosin, all of which are available from DRT, Dax, France; hot melts and reactive hot melts, such as, for example and without limitation, one or more of the following: HP008, Swift®Lock 2003, Swift®Lock 2009, Swift®Lock 2028, Swift®Lock 2028, Swift®Lock 2681, Swift®Lock 2682, Swift®Lock 2914, Swift®Lock 2U1091N, Swift®Lock 2U232-3N, Swift®Lock 2U235, Swift®Lock 2U340, Swift®Lock 2U566, Swift®Lock 2U611, Swift®Lock 4780, Swift®Lock 9041, all of which are available from H. B. Fuller, Minn.; some further examples of polymers, copolymers, and homopolymers, among others, include, for example and without limitation, one or more of the following: RT2115, RT2180, RT2215, RT2280, RT2304, RT2315, RT2330, RT2385, RT3460, RT2515, RT2535, RT2585, RT2715, RT2730, RT2732, RT2780, RT2788, RT2807, RT2815, RT2830, RT2880, RT6275, RT6723, RT6825, RT7723, RT9130, RT9721, RT9705, RT9745, all of which are available from REXtac Polymers, Odessa, Tex. In some embodiments, a precursor refers to a monomer, oligomer, or other starting material capable of being polymerized to form the polymers disclosed herein.

In some embodiments, the coating may comprise, consist of, or consist essentially of more than two polymers. For example, in some embodiments, the coating may comprise, consist of, or consist essentially of three polymers. In some embodiments, the coating may comprise, consist of, or consist essentially of four polymers. In some embodiments, the coating may comprise, consist of, or consist essentially of five polymers. In some embodiments, the coating may comprise, consist of, or consist essentially of six polymers. In some embodiments, the coating may comprise, consist of, or consist essentially of seven polymers. In some embodiments, the coating may comprise, consist of, or consist essentially of eight polymers. In some embodiments, the coating may comprise, consist of, or consist essentially of nine polymers. In some embodiments, the coating may comprise, consist of, or consist essentially of ten or more polymers. In some embodiments, for example, the coating may further comprise at least one of a polymer C, a polymer D, a polymer E, a polymer F, a polymer G, a polymer H, a polymer I, a polymer J, a polymer K, or any combination thereof.

In some embodiments, the coating may comprise, consist of, or consist essentially of at least 5% by weight of at least one of the polymer A, the polymer B, or any combination thereof based on a total weight of the coating. In some embodiments, the coating may comprise, consist of, or consist essentially of at least 8% by weight of at least one of the polymer A, the polymer B, or any combination thereof based on the total weight of the coating. In some embodiments, the coating may comprise, consist of, or consist essentially of at least 10% by weight of at least one of the polymer A, the polymer B, or any combination thereof based on the total weight of the coating. In some embodiments, the coating may comprise, consist of, or consist essentially of at least 12% by weight of at least one of the polymer A, the polymer B, or any combination thereof based on the total weight of the coating. In some embodiments, the coating may comprise, consist of, or consist essentially of at least 15% by weight of at least one of the polymer A, the polymer B, or any combination thereof based on the total weight of the coating. In some embodiments, the coating may comprise, consist of, or consist essentially of at least 18% by weight of at least one of the polymer A, the polymer B, or any combination thereof based on the total weight of the coating. In some embodiments, the coating may comprise, consist of, or consist essentially of at least 20% by weight of at least one of the polymer A, the polymer B, or any combination thereof based on the total weight of the coating. In some embodiments, the coating may comprise, consist of, or consist essentially of at least 22% by weight of at least one of the polymer A, the polymer B, or any combination thereof based on the total weight of the coating. In some embodiments, the coating may comprise, consist of, or consist essentially of at least 25% by weight of at least one of the polymer A, the polymer B, or any combination thereof based on the total weight of the coating. In some embodiments, the coating may comprise, consist of, or consist essentially of at least 28% by weight of at least one of the polymer A, the polymer B, or any combination thereof based on the total weight of the coating. In some embodiments, the coating may comprise, consist of, or consist essentially of at least 30% by weight of at least one of the polymer A, the polymer B, or any combination thereof based on the total weight of the coating. In some embodiments, the coating may comprise, consist of, or consist essentially of at least 32% by weight of at least one of the polymer A, the polymer B, or any combination thereof based on the total weight of the coating. In some embodiments, the coating may comprise, consist of, or consist essentially of at least 35% by weight of at least one of the polymer A, the polymer B, or any combination thereof based on the total weight of the coating. In some embodiments, the coating may comprise, consist of, or consist essentially of at least 38% by weight of at least one of the polymer A, the polymer B, or any combination thereof based on the total weight of the coating. In some embodiments, the coating may comprise, consist of, or consist essentially of at least 40% by weight of at least one of the polymer A, the polymer B, or any combination thereof based on the total weight of the coating. In some embodiments, the coating may comprise, consist of, or consist essentially of at least 42% by weight of at least one of the polymer A, the polymer B, or any combination thereof based on the total weight of the coating. In some embodiments, the coating may comprise, consist of, or consist essentially of at least 45% by weight of at least one of the polymer A, the polymer B, or any combination thereof based on the total weight of the coating. In some embodiments, the coating may comprise, consist of, or consist essentially of at least 48% by weight of at least one of the polymer A, the polymer B, or any combination thereof based on the total weight of the coating. In some embodiments, the coating may comprise, consist of, or consist essentially of at least 50% by weight of at least one of the polymer A, the polymer B, or any combination thereof based on the total weight of the coating. In some embodiments, the coating may comprise, consist of, or consist essentially of at least 52% by weight of at least one of the polymer A, the polymer B, or any combination thereof based on the total weight of the coating. In some embodiments, the coating may comprise, consist of, or consist essentially of at least 55% by weight of at least one of the polymer A, the polymer B, or any combination thereof based on the total weight of the coating. In some embodiments, the coating may comprise, consist of, or consist essentially of at least 58% by weight of at least one of the polymer A, the polymer B, or any combination thereof based on the total weight of the coating. In some embodiments, the coating may comprise, consist of, or consist essentially of at least 60% by weight of at least one of the polymer A, the polymer B, or any combination thereof based on the total weight of the coating. In some embodiments, the coating may comprise, consist of, or consist essentially of at least 62% by weight of at least one of the polymer A, the polymer B, or any combination thereof based on the total weight of the coating. In some embodiments, the coating may comprise, consist of, or consist essentially of at least 65% by weight of at least one of the polymer A, the polymer B, or any combination thereof based on the total weight of the coating. In some embodiments, the coating may comprise, consist of, or consist essentially of at least 68% by weight of at least one of the polymer A, the polymer B, or any combination thereof based on the total weight of the coating. In some embodiments, the coating may comprise, consist of, or consist essentially of at least 70% by weight of at least one of the polymer A, the polymer B, or any combination thereof based on the total weight of the coating. In some embodiments, the coating may comprise, consist of, or consist essentially of at least 72% by weight of at least one of the polymer A, the polymer B, or any combination thereof based on the total weight of the coating. In some embodiments, the coating may comprise, consist of, or consist essentially of at least 75% by weight of at least one of the polymer A, the polymer B, or any combination thereof based on the total weight of the coating. In some embodiments, the coating may comprise, consist of, or consist essentially of at least 78% by weight of at least one of the polymer A, the polymer B, or any combination thereof based on the total weight of the coating. In some embodiments, the coating may comprise, consist of, or consist essentially of at least 80% by weight of at least one of the polymer A, the polymer B, or any combination thereof based on the total weight of the coating. In some embodiments, the coating may comprise, consist of, or consist essentially of at least 82% by weight of at least one of the polymer A, the polymer B, or any combination thereof based on the total weight of the coating. In some embodiments, the coating may comprise, consist of, or consist essentially of at least 85% by weight of at least one of the polymer A, the polymer B, or any combination thereof based on the total weight of the coating. In some embodiments, the coating may comprise, consist of, or consist essentially of at least 88% by weight of at least one of the polymer A, the polymer B, or any combination thereof based on the total weight of the coating. In some embodiments, the coating may comprise, consist of, or consist essentially of at least 90% by weight of at least one of the polymer A, the polymer B, or any combination thereof based on the total weight of the coating. In some embodiments, the coating may comprise, consist of, or consist essentially of at least 92% by weight of at least one of the polymer A, the polymer B, or any combination thereof based on the total weight of the coating. In some embodiments, the coating may comprise, consist of, or consist essentially of at least 95% by weight of at least one of the polymer A, the polymer B, or any combination thereof based on the total weight of the coating.

In some embodiments, the coating may comprise, consist of, or consist essentially of 5% to 8% by weight of at least one of the polymer A, the polymer B, or any combination thereof based on the total weight of the coating. In some embodiments, the coating may comprise, consist of, or consist essentially of 5% to 10% by weight of at least one of the polymer A, the polymer B, or any combination thereof based on the total weight of the coating. In some embodiments, the coating may comprise, consist of, or consist essentially of 5% to 12% by weight of at least one of the polymer A, the polymer B, or any combination thereof based on the total weight of the coating. In some embodiments, the coating may comprise, consist of, or consist essentially of 5% to 15% by weight of at least one of the polymer A, the polymer B, or any combination thereof based on the total weight of the coating. In some embodiments, the coating may comprise, consist of, or consist essentially of 5% to 18% by weight of at least one of the polymer A, the polymer B, or any combination thereof based on the total weight of the coating. In some embodiments, the coating may comprise, consist of, or consist essentially of 5% to 20% by weight of at least one of the polymer A, the polymer B, or any combination thereof based on the total weight of the coating. In some embodiments, the coating may comprise, consist of, or consist essentially of 5% to 22% by weight of at least one of the polymer A, the polymer B, or any combination thereof based on the total weight of the coating. In some embodiments, the coating may comprise, consist of, or consist essentially of 5% to 25% by weight of at least one of the polymer A, the polymer B, or any combination thereof based on the total weight of the coating. In some embodiments, the coating may comprise, consist of, or consist essentially of 5% to 28% by weight of at least one of the polymer A, the polymer B, or any combination thereof based on the total weight of the coating. In some embodiments, the coating may comprise, consist of, or consist essentially of 5% to 30% by weight of at least one of the polymer A, the polymer B, or any combination thereof based on the total weight of the coating. In some embodiments, the coating may comprise, consist of, or consist essentially of 5% to 32% by weight of at least one of the polymer A, the polymer B, or any combination thereof based on the total weight of the coating. In some embodiments, the coating may comprise, consist of, or consist essentially of 5% to 35% by weight of at least one of the polymer A, the polymer B, or any combination thereof based on the total weight of the coating. In some embodiments, the coating may comprise, consist of, or consist essentially of 5% to 38% by weight of at least one of the polymer A, the polymer B, or any combination thereof based on the total weight of the coating. In some embodiments, the coating may comprise, consist of, or consist essentially of 5% to 40% by weight of at least one of the polymer A, the polymer B, or any combination thereof based on the total weight of the coating. In some embodiments, the coating may comprise, consist of, or consist essentially of 5% to 42% by weight of at least one of the polymer A, the polymer B, or any combination thereof based on the total weight of the coating. In some embodiments, the coating may comprise, consist of, or consist essentially of 5% to 45% by weight of at least one of the polymer A, the polymer B, or any combination thereof based on the total weight of the coating. In some embodiments, the coating may comprise, consist of, or consist essentially of 5% to 48% by weight of at least one of the polymer A, the polymer B, or any combination thereof based on the total weight of the coating. In some embodiments, the coating may comprise, consist of, or consist essentially of 5% to 50% by weight of at least one of the polymer A, the polymer B, or any combination thereof based on the total weight of the coating. In some embodiments, the coating may comprise, consist of, or consist essentially of 5% to 52% by weight of at least one of the polymer A, the polymer B, or any combination thereof based on the total weight of the coating. In some embodiments, the coating may comprise, consist of, or consist essentially of 5% to 55% by weight of at least one of the polymer A, the polymer B, or any combination thereof based on the total weight of the coating. In some embodiments, the coating may comprise, consist of, or consist essentially of 5% to 58% by weight of at least one of the polymer A, the polymer B, or any combination thereof based on the total weight of the coating. In some embodiments, the coating may comprise, consist of, or consist essentially of 5% to 60% by weight of at least one of the polymer A, the polymer B, or any combination thereof based on the total weight of the coating. In some embodiments, the coating may comprise, consist of, or consist essentially of 5% to 62% by weight of at least one of the polymer A, the polymer B, or any combination thereof based on the total weight of the coating. In some embodiments, the coating may comprise, consist of, or consist essentially of 5% to 65% by weight of at least one of the polymer A, the polymer B, or any combination thereof based on the total weight of the coating. In some embodiments, the coating may comprise, consist of, or consist essentially of 5% to 68% by weight of at least one of the polymer A, the polymer B, or any combination thereof based on the total weight of the coating. In some embodiments, the coating may comprise, consist of, or consist essentially of 5% to 70% by weight of at least one of the polymer A, the polymer B, or any combination thereof based on the total weight of the coating. In some embodiments, the coating may comprise, consist of, or consist essentially of 5% to 72% by weight of at least one of the polymer A, the polymer B, or any combination thereof based on the total weight of the coating. In some embodiments, the coating may comprise, consist of, or consist essentially of 5% to 75% by weight of at least one of the polymer A, the polymer B, or any combination thereof based on the total weight of the coating. In some embodiments, the coating may comprise, consist of, or consist essentially of 5% to 78% by weight of at least one of the polymer A, the polymer B, or any combination thereof based on the total weight of the coating. In some embodiments, the coating may comprise, consist of, or consist essentially of 5% to 80% by weight of at least one of the polymer A, the polymer B, or any combination thereof based on the total weight of the coating. In some embodiments, the coating may comprise, consist of, or consist essentially of 5% to 82% by weight of at least one of the polymer A, the polymer B, or any combination thereof based on the total weight of the coating. In some embodiments, the coating may comprise, consist of, or consist essentially of 5% to 85% by weight of at least one of the polymer A, the polymer B, or any combination thereof based on the total weight of the coating. In some embodiments, the coating may comprise, consist of, or consist essentially of 5% to 88% by weight of at least one of the polymer A, the polymer B, or any combination thereof based on the total weight of the coating. In some embodiments, the coating may comprise, consist of, or consist essentially of 5% to 90% by weight of at least one of the polymer A, the polymer B, or any combination thereof based on the total weight of the coating. In some embodiments, the coating may comprise, consist of, or consist essentially of 5% to 92% by weight of at least one of the polymer A, the polymer B, or any combination thereof based on the total weight of the coating. In some embodiments, the coating may comprise, consist of, or consist essentially of 5% to 95% by weight of at least one of the polymer A, the polymer B, or any combination thereof based on the total weight of the coating. In some embodiments, the coating may comprise, consist of, or consist essentially of 5% to 98% by weight of at least one of the polymer A, the polymer B, or any combination thereof based on the total weight of the coating.

In some embodiments, the coating may comprise, consist of, or consist essentially of 8% to 98% by weight of at least one of the polymer A, the polymer B, or any combination thereof based on the total weight of the coating. In some embodiments, the coating may comprise, consist of, or consist essentially of 10% to 98% by weight of at least one of the polymer A, the polymer B, or any combination thereof based on the total weight of the coating. In some embodiments, the coating may comprise, consist of, or consist essentially of 12% to 98% by weight of at least one of the polymer A, the polymer B, or any combination thereof based on the total weight of the coating. In some embodiments, the coating may comprise, consist of, or consist essentially of 15% to 98% by weight of at least one of the polymer A, the polymer B, or any combination thereof based on the total weight of the coating. In some embodiments, the coating may comprise, consist of, or consist essentially of 18% to 98% by weight of at least one of the polymer A, the polymer B, or any combination thereof based on the total weight of the coating. In some embodiments, the coating may comprise, consist of, or consist essentially of 20% to 98% by weight of at least one of the polymer A, the polymer B, or any combination thereof based on the total weight of the coating. In some embodiments, the coating may comprise, consist of, or consist essentially of 22% to 98% by weight of at least one of the polymer A, the polymer B, or any combination thereof based on the total weight of the coating. In some embodiments, the coating may comprise, consist of, or consist essentially of 25% to 98% by weight of at least one of the polymer A, the polymer B, or any combination thereof based on the total weight of the coating. In some embodiments, the coating may comprise, consist of, or consist essentially of 28% to 98% by weight of at least one of the polymer A, the polymer B, or any combination thereof based on the total weight of the coating. In some embodiments, the coating may comprise, consist of, or consist essentially of 30% to 98% by weight of at least one of the polymer A, the polymer B, or any combination thereof based on the total weight of the coating. In some embodiments, the coating may comprise, consist of, or consist essentially of 32% to 98% by weight of at least one of the polymer A, the polymer B, or any combination thereof based on the total weight of the coating. In some embodiments, the coating may comprise, consist of, or consist essentially of 35% to 98% by weight of at least one of the polymer A, the polymer B, or any combination thereof based on the total weight of the coating. In some embodiments, the coating may comprise, consist of, or consist essentially of 38% to 98% by weight of at least one of the polymer A, the polymer B, or any combination thereof based on the total weight of the coating. In some embodiments, the coating may comprise, consist of, or consist essentially of 40% to 98% by weight of at least one of the polymer A, the polymer B, or any combination thereof based on the total weight of the coating. In some embodiments, the coating may comprise, consist of, or consist essentially of 42% to 98% by weight of at least one of the polymer A, the polymer B, or any combination thereof based on the total weight of the coating. In some embodiments, the coating may comprise, consist of, or consist essentially of 45% to 98% by weight of at least one of the polymer A, the polymer B, or any combination thereof based on the total weight of the coating. In some embodiments, the coating may comprise, consist of, or consist essentially of 48% to 98% by weight of at least one of the polymer A, the polymer B, or any combination thereof based on the total weight of the coating. In some embodiments, the coating may comprise, consist of, or consist essentially of 50% to 98% by weight of at least one of the polymer A, the polymer B, or any combination thereof based on the total weight of the coating. In some embodiments, the coating may comprise, consist of, or consist essentially of 52% to 98% by weight of at least one of the polymer A, the polymer B, or any combination thereof based on the total weight of the coating. In some embodiments, the coating may comprise, consist of, or consist essentially of 55% to 98% by weight of at least one of the polymer A, the polymer B, or any combination thereof based on the total weight of the coating. In some embodiments, the coating may comprise, consist of, or consist essentially of 58% to 98% by weight of at least one of the polymer A, the polymer B, or any combination thereof based on the total weight of the coating. In some embodiments, the coating may comprise, consist of, or consist essentially of 60% to 98% by weight of at least one of the polymer A, the polymer B, or any combination thereof based on the total weight of the coating. In some embodiments, the coating may comprise, consist of, or consist essentially of 62% to 98% by weight of at least one of the polymer A, the polymer B, or any combination thereof based on the total weight of the coating. In some embodiments, the coating may comprise, consist of, or consist essentially of 65% to 98% by weight of at least one of the polymer A, the polymer B, or any combination thereof based on the total weight of the coating. In some embodiments, the coating may comprise, consist of, or consist essentially of 68% to 98% by weight of at least one of the polymer A, the polymer B, or any combination thereof based on the total weight of the coating. In some embodiments, the coating may comprise, consist of, or consist essentially of 70% to 98% by weight of at least one of the polymer A, the polymer B, or any combination thereof based on the total weight of the coating. In some embodiments, the coating may comprise, consist of, or consist essentially of 72% to 98% by weight of at least one of the polymer A, the polymer B, or any combination thereof based on the total weight of the coating. In some embodiments, the coating may comprise, consist of, or consist essentially of 75% to 98% by weight of at least one of the polymer A, the polymer B, or any combination thereof based on the total weight of the coating. In some embodiments, the coating may comprise, consist of, or consist essentially of 78% to 98% by weight of at least one of the polymer A, the polymer B, or any combination thereof based on the total weight of the coating. In some embodiments, the coating may comprise, consist of, or consist essentially of 80% to 98% by weight of at least one of the polymer A, the polymer B, or any combination thereof based on the total weight of the coating. In some embodiments, the coating may comprise, consist of, or consist essentially of 82% to 98% by weight of at least one of the polymer A, the polymer B, or any combination thereof based on the total weight of the coating. In some embodiments, the coating may comprise, consist of, or consist essentially of 85% to 98% by weight of at least one of the polymer A, the polymer B, or any combination thereof based on the total weight of the coating. In some embodiments, the coating may comprise, consist of, or consist essentially of 88% to 98% by weight of at least one of the polymer A, the polymer B, or any combination thereof based on the total weight of the coating. In some embodiments, the coating may comprise, consist of, or consist essentially of 90% to 98% by weight of at least one of the polymer A, the polymer B, or any combination thereof based on the total weight of the coating.

In some embodiments, the coating may comprise, consist of, or consist essentially of 10% to 90% by weight of at least one of the polymer A, the polymer B, or any combination thereof based on the total weight of the coating. In some embodiments, the coating may comprise, consist of, or consist essentially of 15% to 85% by weight of at least one of the polymer A, the polymer B, or any combination thereof based on the total weight of the coating. In some embodiments, the coating may comprise, consist of, or consist essentially of 20% to 80% by weight of at least one of the polymer A, the polymer B, or any combination thereof based on the total weight of the coating. In some embodiments, the coating may comprise, consist of, or consist essentially of 25% to 75% by weight of at least one of the polymer A, the polymer B, or any combination thereof based on the total weight of the coating. In some embodiments, the coating may comprise, consist of, or consist essentially of 30% to 70% by weight of at least one of the polymer A, the polymer B, or any combination thereof based on the total weight of the coating. In some embodiments, the coating may comprise, consist of, or consist essentially of 35% to 65% by weight of at least one of the polymer A, the polymer B, or any combination thereof based on the total weight of the coating. In some embodiments, the coating may comprise, consist of, or consist essentially of 40% to 60% by weight of at least one of the polymer A, the polymer B, or any combination thereof based on the total weight of the coating. In some embodiments, the coating may comprise, consist of, or consist essentially of 45% to 55% by weight of at least one of the polymer A, the polymer B, or any combination thereof based on the total weight of the coating.

In some embodiments, the coating may comprise, consist of, or consist essentially of 15% to 75% by weight of the polymer A and 25% to 85% by weight of the polymer B. In some embodiments, the coating may comprise, consist of, or consist essentially of 15% to 35% by weight of the polymer A and 65% to 85% by weight of the polymer B. In some embodiments, the coating may comprise, consist of, or consist essentially of 25% to 75% by weight of the polymer A and 25% to 75% by weight of the polymer B. In some embodiments, the coating may comprise, consist of, or consist essentially of 35% to 75% by weight of the polymer A and 25% to 65% by weight of the polymer B. In some embodiments, the coating may comprise, consist of, or consist essentially of 45% to 75% by weight of the polymer A and 25% to 55% by weight of the polymer B. In some embodiments, the coating may comprise, consist of, or consist essentially of 40% to 60% by weight of the polymer A and 40% to 60% by weight of the polymer B. In some embodiments, the coating may comprise, consist of, or consist essentially of 55% to 75% by weight of the polymer A and 25% to 45% by weight of the polymer B. In some embodiments, the coating may comprise, consist of, or consist essentially of 65% to 75% by weight of the polymer A and 25% to 35% by weight of the polymer B. In some embodiments, the coating may comprise, consist of, or consist essentially of 15% to 65% by weight of the polymer A and 35% to 85% by weight of the polymer B. In some embodiments, the coating may comprise, consist of, or consist essentially of 15% to 55% by weight of the polymer A and 45% to 85% by weight of the polymer B. In some embodiments, the coating may comprise, consist of, or consist essentially of 15% to 45% by weight of the polymer A and 55% to 85% by weight of the polymer B. In some embodiments, the coating may comprise, consist of, or consist essentially of 15% to 35% by weight of the polymer A and 65% to 85% by weight of the polymer B. In some embodiments, the coating may comprise, consist of, or consist essentially of 15% to 25% by weight of the polymer A and 75% to 85% by weight of the polymer B.

In some embodiments, a ratio of the polymer A to the polymer B is 1:10 to 10:1. In some embodiments, the ratio of the polymer A to the polymer B is 1:9 to 1:10. In some embodiments, the ratio of the polymer A to the polymer B is 1:8 to 1:10. In some embodiments, the ratio of the polymer A to the polymer B is 1:7 to 1:10. In some embodiments, the ratio of the polymer A to the polymer B is 1:6 to 1:10. In some embodiments, the ratio of the polymer A to the polymer B is 1:5 to 1:10. In some embodiments, the ratio of the polymer A to the polymer B is 1:4 to 1:10. In some embodiments, the ratio of the polymer A to the polymer B is 1:3 to 1:10. In some embodiments, the ratio of the polymer A to the polymer B is 1:2 to 1:10. In some embodiments, the ratio of the polymer A to the polymer B is 1:1 to 1:10. In some embodiments, the ratio of the polymer A to the polymer B is 1:1 to 10:1. In some embodiments, the ratio of the polymer A to the polymer B is 2:1 to 10:1. In some embodiments, the ratio of the polymer A to the polymer B is 3:1 to 10:1. In some embodiments, the ratio of the polymer A to the polymer B is 4:1 to 10:1. In some embodiments, the ratio of the polymer A to the polymer B is 5:1 to 10:1. In some embodiments, the ratio of the polymer A to the polymer B is 6:1 to 10:1. In some embodiments, the ratio of the polymer A to the polymer B is 7:1 to 10:1. In some embodiments, the ratio of the polymer A to the polymer B is 8:1 to 10:1. In some embodiments, the ratio of the polymer A to the polymer B is 9:1 to 10:1. In some embodiments, a ratio of the polymer A to the polymer B is 1:9 to 9:1. In some embodiments, a ratio of the polymer A to the polymer B is 1:8 to 8:1. In some embodiments, a ratio of the polymer A to the polymer B is 1:7 to 7:1. In some embodiments, a ratio of the polymer A to the polymer B is 1:6 to 6:1. In some embodiments, a ratio of the polymer A to the polymer B is 1:5 to 5:1. In some embodiments, a ratio of the polymer A to the polymer B is 1:4 to 4:1. In some embodiments, a ratio of the polymer A to the polymer B is 1:3 to 3:1. In some embodiments, a ratio of the polymer A to the polymer B is 1:2 to 2:1. In some embodiments, the ratio of the polymer A and the polymer B is selected or adjusted to control a curing time of the polymer network, the coating, or any combination thereof. In some embodiments, the ratio of the polymer A and the polymer B is selected or adjusted to not result in phase separation.

In some embodiments, at least one of the polymer A, the polymer B, or any combination thereof may comprise, consist of, or consist essentially of an unreacted polymer having crosslinkable polymer chains which are not crosslinked. In some embodiments, at least one of the polymer A, the polymer B, or any combination thereof may comprise, consist of, or consist essentially of a reacted polymer having crosslinked polymer chains. In some embodiments, at least one of the polymer A, the polymer B, or any combination thereof may comprise, consist of, or consist essentially of a reacted polymer having crosslinked polymer chains and an unreacted polymer having crosslinkable polymer chains which are not crosslinked. In some embodiments, at least one of the polymer A, the polymer B, or any combination thereof may comprise, consist of, or consist essentially of a linear polymer. In some embodiments, at least one of the polymer A, the polymer B, or any combination thereof may comprise, consist of, or consist essentially of a branched polymer. In some embodiments, at least one of the polymer A, the polymer B, or any combination thereof may comprise, consist of, or consist essentially of at least one of a linear polymer, a branched polymer, or any combination thereof. In some embodiments, at least one of the polymer A, the polymer B, or any combination thereof is a crosslinked polymer. In some embodiments, the at least one of the polymer A, the polymer B, or any combination thereof is a dispersed phase. For example, in some embodiments, the polymer A is crosslinked and the polymer B is a dispersed phase, wherein the polymer B is not crosslinked. In some embodiments, the polymer A is crosslinked and the polymer B is crosslinked. In some embodiments, the polymer A is crosslinked. In some embodiments, the polymer B is not crosslinked. In some embodiments, the polymer B is crosslinked.

In some embodiments, the at least one filler may comprise, consist of, or consist essentially of at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled materials (e.g., such as one or more of recycled rubber tires, recycled shingles, recycled thermoplastic resins), basalt, roofing granules, graphite, clay, or any combination thereof. In some embodiments, the at least one filler does not comprise limestone. In some embodiments, the coating does not comprise limestone.

In some embodiments, the coating may comprise, consist of, or consist essentially of at least 2% by weight of the at least one filler based on the total weight of the coating. In some embodiments, the coating may comprise, consist of, or consist essentially of at least 5% by weight of the at least one filler based on the total weight of the coating. In some embodiments, the coating may comprise, consist of, or consist essentially of at least 8% by weight of the at least one filler based on the total weight of the coating. In some embodiments, the coating may comprise, consist of, or consist essentially of at least 10% by weight of the at least one filler based on the total weight of the coating. In some embodiments, the coating may comprise, consist of, or consist essentially of at least 12% by weight of the at least one filler based on the total weight of the coating. In some embodiments, the coating may comprise, consist of, or consist essentially of at least 15% by weight of the at least one filler based on the total weight of the coating. In some embodiments, the coating may comprise, consist of, or consist essentially of at least 18% by weight of the at least one filler based on the total weight of the coating. In some embodiments, the coating may comprise, consist of, or consist essentially of at least 20% by weight of the at least one filler based on the total weight of the coating. In some embodiments, the coating may comprise, consist of, or consist essentially of at least 22% by weight of the at least one filler based on the total weight of the coating. In some embodiments, the coating may comprise, consist of, or consist essentially of at least 25% by weight of the at least one filler based on the total weight of the coating. In some embodiments, the coating may comprise, consist of, or consist essentially of at least 28% by weight of the at least one filler based on the total weight of the coating. In some embodiments, the coating may comprise, consist of, or consist essentially of at least 30% by weight of the at least one filler based on the total weight of the coating. In some embodiments, the coating may comprise, consist of, or consist essentially of at least 32% by weight of the at least one filler based on the total weight of the coating. In some embodiments, the coating may comprise, consist of, or consist essentially of at least 35% by weight of the at least one filler based on the total weight of the coating. In some embodiments, the coating may comprise, consist of, or consist essentially of at least 38% by weight of the at least one filler based on the total weight of the coating. In some embodiments, the coating may comprise, consist of, or consist essentially of at least 40% by weight of the at least one filler based on the total weight of the coating. In some embodiments, the coating may comprise, consist of, or consist essentially of at least 42% by weight of the at least one filler based on the total weight of the coating. In some embodiments, the coating may comprise, consist of, or consist essentially of at least 45% by weight of the at least one filler based on the total weight of the coating. In some embodiments, the coating may comprise, consist of, or consist essentially of at least 48% by weight of the at least one filler based on the total weight of the coating. In some embodiments, the coating may comprise, consist of, or consist essentially of at least 50% by weight of the at least one filler based on the total weight of the coating. In some embodiments, the coating may comprise, consist of, or consist essentially of at least 52% by weight of the at least one filler based on the total weight of the coating. In some embodiments, the coating may comprise, consist of, or consist essentially of at least 55% by weight of the at least one filler based on the total weight of the coating. In some embodiments, the coating may comprise, consist of, or consist essentially of at least 58% by weight of the at least one filler based on the total weight of the coating. In some embodiments, the coating may comprise, consist of, or consist essentially of at least 60% by weight of the at least one filler based on the total weight of the coating. In some embodiments, the coating may comprise, consist of, or consist essentially of at least 62% by weight of the at least one filler based on the total weight of the coating. In some embodiments, the coating may comprise, consist of, or consist essentially of at least 65% by weight of the at least one filler based on the total weight of the coating. In some embodiments, the coating may comprise, consist of, or consist essentially of at least 68% by weight of the at least one filler based on the total weight of the coating. In some embodiments, the coating may comprise, consist of, or consist essentially of at least 70% by weight of the at least one filler based on the total weight of the coating. In some embodiments, the coating may comprise, consist of, or consist essentially of at least 72% by weight of the at least one filler based on the total weight of the coating. In some embodiments, the coating may comprise, consist of, or consist essentially of at least 75% by weight of the at least one filler based on the total weight of the coating. In some embodiments, the coating may comprise, consist of, or consist essentially of at least 78% by weight of the at least one filler based on the total weight of the coating. In some embodiments, the coating may comprise, consist of, or consist essentially of at least 80% by weight of the at least one filler based on the total weight of the coating. In some embodiments, the coating may comprise, consist of, or consist essentially of at least 82% by weight of the at least one filler based on the total weight of the coating. In some embodiments, the coating may comprise, consist of, or consist essentially of at least 85% by weight of the at least one filler based on the total weight of the coating. In some embodiments, the coating may comprise, consist of, or consist essentially of at least 88% by weight of the at least one filler based on the total weight of the coating. In some embodiments, the coating may comprise, consist of, or consist essentially of at least 90% by weight of the at least one filler based on the total weight of the coating. In some embodiments, the coating may comprise, consist of, or consist essentially of at least 92% by weight of the at least one filler based on the total weight of the coating. In some embodiments, the coating may comprise, consist of, or consist essentially of at least 95% by weight of the at least one filler based on the total weight of the coating.

In some embodiments, the coating may comprise, consist of, or consist essentially of 2% to 5% by weight of the at least one filler based on the total weight of the coating. In some embodiments, the coating may comprise, consist of, or consist essentially of 2% to 8% by weight of the at least one filler based on the total weight of the coating. In some embodiments, the coating may comprise, consist of, or consist essentially of 2% to 10% by weight of the at least one filler based on the total weight of the coating. In some embodiments, the coating may comprise, consist of, or consist essentially of 2% to 12% by weight of the at least one filler based on the total weight of the coating. In some embodiments, the coating may comprise, consist of, or consist essentially of 2% to 15% by weight of the at least one filler based on the total weight of the coating. In some embodiments, the coating may comprise, consist of, or consist essentially of 2% to 18% by weight of the at least one filler based on the total weight of the coating. In some embodiments, the coating may comprise, consist of, or consist essentially of 2% to 20% by weight of the at least one filler based on the total weight of the coating. In some embodiments, the coating may comprise, consist of, or consist essentially of 2% to 22% by weight of the at least one filler based on the total weight of the coating. In some embodiments, the coating may comprise, consist of, or consist essentially of 2% to 25% by weight of the at least one filler based on the total weight of the coating. In some embodiments, the coating may comprise, consist of, or consist essentially of 2% to 28% by weight of the at least one filler based on the total weight of the coating. In some embodiments, the coating may comprise, consist of, or consist essentially of 2% to 30% by weight of the at least one filler based on the total weight of the coating. In some embodiments, the coating may comprise, consist of, or consist essentially of 2% to 32% by weight of the at least one filler based on the total weight of the coating. In some embodiments, the coating may comprise, consist of, or consist essentially of 2% to 35% by weight of the at least one filler based on the total weight of the coating. In some embodiments, the coating may comprise, consist of, or consist essentially of 2% to 38% by weight of the at least one filler based on the total weight of the coating. In some embodiments, the coating may comprise, consist of, or consist essentially of 2% to 40% by weight of the at least one filler based on the total weight of the coating. In some embodiments, the coating may comprise, consist of, or consist essentially of 2% to 42% by weight of the at least one filler based on the total weight of the coating. In some embodiments, the coating may comprise, consist of, or consist essentially of 2% to 45% by weight of the at least one filler based on the total weight of the coating. In some embodiments, the coating may comprise, consist of, or consist essentially of 5% to 48% by weight of the at least one filler based on the total weight of the coating. In some embodiments, the coating may comprise, consist of, or consist essentially of 2% to 50% by weight of the at least one filler based on the total weight of the coating. In some embodiments, the coating may comprise, consist of, or consist essentially of 2% to 52% by weight of the at least one filler based on the total weight of the coating. In some embodiments, the coating may comprise, consist of, or consist essentially of 2% to 55% by weight of the at least one filler based on the total weight of the coating. In some embodiments, the coating may comprise, consist of, or consist essentially of 2% to 58% by weight of the at least one filler based on the total weight of the coating. In some embodiments, the coating may comprise, consist of, or consist essentially of 2% to 60% by weight of the at least one filler based on the total weight of the coating. In some embodiments, the coating may comprise, consist of, or consist essentially of 2% to 62% by weight of the at least one filler based on the total weight of the coating. In some embodiments, the coating may comprise, consist of, or consist essentially of 2% to 65% by weight of the at least one filler based on the total weight of the coating. In some embodiments, the coating may comprise, consist of, or consist essentially of 2% to 68% by weight of the at least one filler based on the total weight of the coating. In some embodiments, the coating may comprise, consist of, or consist essentially of 2% to 70% by weight of the at least one filler based on the total weight of the coating. In some embodiments, the coating may comprise, consist of, or consist essentially of 2% to 72% by weight of the at least one filler based on the total weight of the coating. In some embodiments, the coating may comprise, consist of, or consist essentially of 2% to 75% by weight of the at least one filler based on the total weight of the coating. In some embodiments, the coating may comprise, consist of, or consist essentially of 2% to 78% by weight of the at least one filler based on the total weight of the coating. In some embodiments, the coating may comprise, consist of, or consist essentially of 2% to 80% by weight of the at least one filler based on the total weight of the coating. In some embodiments, the coating may comprise, consist of, or consist essentially of 2% to 82% by weight of the at least one filler based on the total weight of the coating. In some embodiments, the coating may comprise, consist of, or consist essentially of 2% to 85% by weight of the at least one filler based on the total weight of the coating. In some embodiments, the coating may comprise, consist of, or consist essentially of 2% to 88% by weight of the at least one filler based on the total weight of the coating. In some embodiments, the coating may comprise, consist of, or consist essentially of 2% to 90% by weight of the at least one filler based on the total weight of the coating. In some embodiments, the coating may comprise, consist of, or consist essentially of 2% to 92% by weight of the at least one filler based on the total weight of the coating. In some embodiments, the coating may comprise, consist of, or consist essentially of 2% to 95% by weight of the at least one filler based on the total weight of the coating.

In some embodiments, the coating may comprise, consist of, or consist essentially of 2% to 95% by weight of the at least one filler based on the total weight of the coating. In some embodiments, the coating may comprise, consist of, or consist essentially of 8% to 95% by weight of the at least one filler based on the total weight of the coating. In some embodiments, the coating may comprise, consist of, or consist essentially of 10% to 95% by weight of the at least one filler based on the total weight of the coating. In some embodiments, the coating may comprise, consist of, or consist essentially of 12% to 95% by weight of the at least one filler based on the total weight of the coating. In some embodiments, the coating may comprise, consist of, or consist essentially of 15% to 95% by weight of the at least one filler based on the total weight of the coating. In some embodiments, the coating may comprise, consist of, or consist essentially of 18% to 95% by weight of the at least one filler based on the total weight of the coating. In some embodiments, the coating may comprise, consist of, or consist essentially of 20% to 95% by weight of the at least one filler based on the total weight of the coating. In some embodiments, the coating may comprise, consist of, or consist essentially of 22% to 95% by weight of the at least one filler based on the total weight of the coating. In some embodiments, the coating may comprise, consist of, or consist essentially of 25% to 95% by weight of the at least one filler based on the total weight of the coating. In some embodiments, the coating may comprise, consist of, or consist essentially of 28% to 95% by weight of the at least one filler based on the total weight of the coating. In some embodiments, the coating may comprise, consist of, or consist essentially of 30% to 95% by weight of the at least one filler based on the total weight of the coating. In some embodiments, the coating may comprise, consist of, or consist essentially of 32% to 95% by weight of the at least one filler based on the total weight of the coating. In some embodiments, the coating may comprise, consist of, or consist essentially of 35% to 95% by weight of the at least one filler based on the total weight of the coating. In some embodiments, the coating may comprise, consist of, or consist essentially of 38% to 95% by weight of the at least one filler based on the total weight of the coating. In some embodiments, the coating may comprise, consist of, or consist essentially of 40% to 95% by weight of the at least one filler based on the total weight of the coating. In some embodiments, the coating may comprise, consist of, or consist essentially of 42% to 95% by weight of the at least one filler based on the total weight of the coating. In some embodiments, the coating may comprise, consist of, or consist essentially of 45% to 95% by weight of the at least one filler based on the total weight of the coating. In some embodiments, the coating may comprise, consist of, or consist essentially of 48% to 95% by weight of the at least one filler based on the total weight of the coating. In some embodiments, the coating may comprise, consist of, or consist essentially of 50% to 95% by weight of the at least one filler based on the total weight of the coating. In some embodiments, the coating may comprise, consist of, or consist essentially of 52% to 95% by weight of the at least one filler based on the total weight of the coating. In some embodiments, the coating may comprise, consist of, or consist essentially of 55% to 95% by weight of the at least one filler based on the total weight of the coating. In some embodiments, the coating may comprise, consist of, or consist essentially of 58% to 95% by weight of the at least one filler based on the total weight of the coating. In some embodiments, the coating may comprise, consist of, or consist essentially of 60% to 95% by weight of the at least one filler based on the total weight of the coating. In some embodiments, the coating may comprise, consist of, or consist essentially of 62% to 95% by weight of the at least one filler based on the total weight of the coating. In some embodiments, the coating may comprise, consist of, or consist essentially of 65% to 95% by weight of the at least one filler based on the total weight of the coating. In some embodiments, the coating may comprise, consist of, or consist essentially of 68% to 95% by weight of the at least one filler based on the total weight of the coating. In some embodiments, the coating may comprise, consist of, or consist essentially of 70% to 95% by weight of the at least one filler based on the total weight of the coating. In some embodiments, the coating may comprise, consist of, or consist essentially of 72% to 95% by weight of the at least one filler based on the total weight of the coating. In some embodiments, the coating may comprise, consist of, or consist essentially of 75% to 95% by weight of the at least one filler based on the total weight of the coating. In some embodiments, the coating may comprise, consist of, or consist essentially of 78% to 95% by weight of the at least one filler based on the total weight of the coating. In some embodiments, the coating may comprise, consist of, or consist essentially of 80% to 95% by weight of the at least one filler based on the total weight of the coating. In some embodiments, the coating may comprise, consist of, or consist essentially of 82% to 95% by weight of the at least one filler based on the total weight of the coating. In some embodiments, the coating may comprise, consist of, or consist essentially of 85% to 95% by weight of the at least one filler based on the total weight of the coating. In some embodiments, the coating may comprise, consist of, or consist essentially of 88% to 95% by weight of the at least one filler based on the total weight of the coating. In some embodiments, the coating may comprise, consist of, or consist essentially of 90% to 95% by weight of the at least one filler based on the total weight of the coating.

In some embodiments, the coating may comprise, consist of, or consist essentially of 10% to 90% by weight of the at least one filler based on the total weight of the coating. In some embodiments, the coating may comprise, consist of, or consist essentially of 15% to 85% by weight of the at least one filler based on the total weight of the coating. In some embodiments, the coating may comprise, consist of, or consist essentially of 20% to 80% by weight of the at least one filler based on the total weight of the coating. In some embodiments, the coating may comprise, consist of, or consist essentially of 40% to 80% by weight of the at least one filler based on the total weight of the coating. In some embodiments, the coating may comprise, consist of, or consist essentially of 25% to 75% by weight of the at least one filler based on the total weight of the coating. In some embodiments, the coating may comprise, consist of, or consist essentially of 30% to 70% by weight of the at least one filler based on the total weight of the coating. In some embodiments, the coating may comprise, consist of, or consist essentially of 35% to 65% by weight of the at least one filler based on the total weight of the coating. In some embodiments, the coating may comprise, consist of, or consist essentially of 40% to 60% by weight of the at least one filler based on the total weight of the coating. In some embodiments, the coating may comprise, consist of, or consist essentially of 45% to 55% by weight of the at least one filler based on the total weight of the coating.

In some embodiments, the at least one filler may comprise a recycled material. In some embodiments, a recycled material may include at least one of polyvinyl butyral (rPVB), post-consumer asphalt shingles (PCRAS), post-manufacture shingle waste, recycled asphaltic membranes, polytransoctenamer rubber (TOR), ground tire rubber (GTR), acrylonitrile rubber (NBR), acrylonitrile butadiene styrene rubber (ABS), wood plastic, polypropylene (PP), atactic polypropylene (APP), or any combination thereof. A non-limiting example of GTR includes GTR, which is available from Lehigh Technologies, Tucker, Ga. Other wastes and/or recycled materials that can be incorporated into the coating include, for example and without limitation, one or more of petroleum coke, high temperature tolerant reinforced resins, poly(methyl methacrylate) (PMMA), polyvinyl chloride (PVC), fly ash, carbon black, titanium dioxide ($TiO_2$), low density polyethylene (LDPE), linear low density polyethylene (LLDPE), high density polyethylene (HDPE), polyethylene terephthalate (PET), recycled styrene butadiene styrene copolymers, recycled engine or processed oils, and fatty acids.

In some embodiments, the at least one filler may comprise, consist of, or consist essentially of 5% to 90% by weight of a recycled material based on the total weight of the at least one filler. In some embodiments, the at least one filler may comprise, consist of, or consist essentially of 5% to 80% by weight of a recycled material based on the total weight of the at least one filler. In some embodiments, the at least one filler may comprise, consist of, or consist essentially of 5% to 70% by weight of a recycled material based on the total weight of the at least one filler. In some embodiments, the at least one filler may comprise, consist of, or consist essentially of 5% to 60% by weight of a recycled material based on the total weight of the at least one filler. In some embodiments, the at least one filler may comprise, consist of, or consist essentially of 5% to 50% by weight of a recycled material based on the total weight of the at least one filler. In some embodiments, the at least one filler may comprise, consist of, or consist essentially of 5% to 40% by weight of a recycled material based on the total weight of the at least one filler. In some embodiments, the at least one filler may comprise, consist of, or consist essentially of 5% to 30% by weight of a recycled material based on the total weight of the at least one filler. In some embodiments, the at least one filler may comprise, consist of, or consist essentially of 5% to 20% by weight of a recycled material based on the total weight of the at least one filler. In some embodiments, the at least one filler may comprise, consist of, or consist essentially of 5% to 10% by weight of a recycled material based on the total weight of the at least one filler. In some embodiments, the at least one filler may comprise, consist of, or consist essentially of 10% to 90% by weight of a recycled material based on the total weight of the at least one filler. In some embodiments, the at least one filler may comprise, consist of, or consist essentially of 20% to 90% by weight of a recycled material based on the total weight of the at least one filler. In some embodiments, the at least one filler may comprise, consist of, or consist essentially of 30% to 90% by weight of a recycled material based on the total weight of the at least one filler. In some embodiments, the at least one filler may comprise, consist of, or consist essentially of 40% to 90% by weight of a recycled material based on the total weight of the at least one filler. In some embodiments, the at least one filler may comprise, consist of, or consist essentially of 50% to 90% by weight of a recycled material based on the total weight of the at least one filler. In some embodiments, the at least one filler may comprise, consist of, or consist essentially of 60% to 90% by weight of a recycled material based on the total weight of the at least one filler. In some embodiments, the at least one filler may comprise, consist of, or consist essentially of 70% to 90% by weight of a recycled material based on the total weight of the at least one filler. In some embodiments, the at least one filler may comprise, consist of, or consist essentially of 80% to 90% by weight of a recycled material based on the total weight of the at least one filler. In some embodiments, the at least one filler may comprise, consist of, or consist essentially of % to 90% by weight of a recycled material based on the total weight of the at least one filler. In some embodiments, the at least one filler may comprise, consist of, or consist essentially of 20% to 80% by weight of a recycled material based on the total weight of the at least one filler. In some embodiments, the at least one filler may comprise, consist of, or consist essentially of 20% to 70% by weight of a recycled material based on the total weight of the at least one filler. In some embodiments, the at least one filler may comprise, consist of, or consist essentially of 20% to 60% by weight of a recycled material based on the total weight of the at least one filler. In some embodiments, the at least one filler may comprise, consist of, or consist essentially of 20% to 50% by weight of a recycled material based on the total weight of the at least one filler. In some embodiments, the at least one filler may comprise, consist of, or consist essentially of 30% to 80% by weight of a recycled material based on the total weight of the at least one filler. In some embodiments, the at least one filler may comprise, consist of, or consist essentially of 30% to 70% by weight of a recycled material based on the total weight of the at least one filler. In some embodiments, the at least one filler may comprise, consist of, or consist essentially of 30% to 60% by weight of a recycled material based on the total weight of the at least one filler. In some embodiments, the at least one filler may comprise, consist of, or consist essentially of 40% to 80% by weight of a recycled material based on the total weight of the at least one filler. In some embodiments, the at least one filler may comprise, consist of, or consist essentially of 40% to 70% by weight of a recycled material based on the total weight of the at least one filler. In some embodiments, the at least one filler may comprise, consist of, or consist essentially of 20% to 40% by weight of a recycled material based on the total weight of the at least one filler.

As used herein, the term "polymer network" may include any three-dimensional structure of chains associated by at least one of a chemical crosslink, a physical crosslink, or any combination thereof. A non-limiting example of a chemical crosslink includes a covalent bond linking two or more chains. A non-limiting example of a physical crosslink includes a non-covalent bond linking two or more chains. In some embodiments, the polymer network may be a result of a chemical reaction between polymer chains (e.g., to form crosslinks). Non-limiting examples of polymer networks include, without limitation, at least one of an interpenetrating polymer network (IPN), a semi-interpenetrating polymer network (semi-IPN), a sequential interpenetrating polymer network, a sequential semi-interpenetrating polymer network, a thermoplastic interpenetrating polymer network, an intertwining interpenetrating polymer network, a co-continuous polymer network, an interlocking polymer network, or any combination thereof.

As used herein, the term "interpenetrating polymer network" refers to two or more polymer networks which are at least partially interlaced on a molecular scale and not covalently bonded to each other and cannot be separated without breaking chemical bonds. In some embodiments, the term interpenetrating polymer network does not include a mixture of two or more pre-formed polymer networks.

As used herein, the term "semi-interpenetrating polymer network" refers to one or more polymer networks which is/are penetrated, on a molecular scale, by at least one polymer. In some embodiments, the one or more polymer networks are penetrated by at least one of at least one linear polymer, at least one branched polymer, or any combination thereof. In some embodiments, a semi-interpenetrating network is distinguished from an interpenetrating polymer network because, with respect to the semi-interpenetrating polymer network, chemical bonds do not need to be broken, either in principle or in practice, to separate the at least one polymer from the one or more polymer networks, which is/are penetrated by the at least one polymer.

As used herein, the term "sequential interpenetrating polymer network" refers to an interpenetrating polymer network prepared by a process in which a first polymer network is formed before a second polymer network is formed.

As used herein, the term "sequential semi-interpenetrating polymer network" refers to a network prepared by a process in which the linear or branched polymers are formed following the completion of the reactions that result in the formation of the network(s), or vice versa.

Figure 1B:
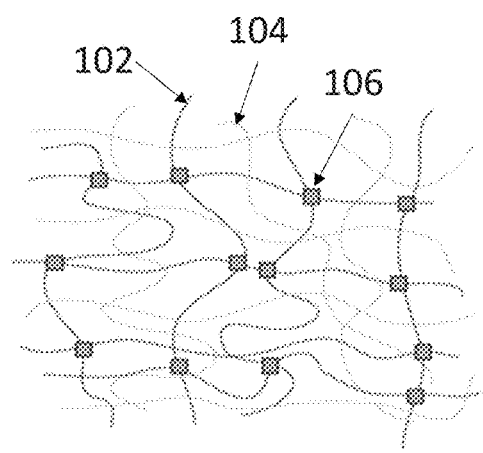

In some embodiments, the polymer A and the polymer B form a polymer network. For example, in some embodiments, the polymer A and the polymer B form at least one of an interpenetrating polymer network, a semi-interpenetrating polymer network, or any combination thereof. In some embodiments, the coating having a polymer network, wherein the polymer network comprises at least the polymer A and the polymer B. In some embodiments, at least one of the polymer A, the polymer B, the at least one filler, or any combination thereof may be selected and/or present in amounts sufficient to result in the coating having a select structure, a select property, or any combination thereof. A non-limiting example of select structure of a coating is presented in FIGS. 1A-1B in which a polymeric network is shown (1A) before and (1B) after curing and FIGS. 2A-2B in which another polymeric network is shown (2A) before and (2B) after curing. In FIGS. 1A-1B, a structure of the coating is shown comprising a first polymer 102 (i.e., Polymer 1) and a second polymer 104 (i.e., Polymer 2), wherein the first polymer is covalently crosslinked via covalent bond 106. In FIGS. 2A-2B, a structure of the coating is shown comprising a first polymer 202 (i.e., Polymer 1) and an oil 204 (e.g., a hydrocarbon oil, etc.), wherein the first polymer is covalently crosslinked via covalent bond 206.

In some embodiments, the select structure of the coating may comprise, consist of, or consist essentially of at least one polymer network. For example, in some embodiments, the coating may comprise, consist of, or consist essentially of one or more polymer networks. In some embodiments, the coating may comprise, consist of, or consist essentially of at least two polymer networks. In some embodiments, the coating may comprise, consist of, or consist essentially of two or more polymer networks. In some embodiments, the coating may comprise, consist of, or consist essentially of three or more polymer networks.

In some embodiments, the coating may comprise, consist of, or consist essentially of an interpenetrating polymer network (IPN). In some embodiments, the coating may comprise, consist of, or consist essentially of a semi-interpenetrating polymer network (semi-IPN). In some embodiments, the coating may comprise, consist of, or consist essentially of at least one of an interpenetrating polymer network, semi-interpenetrating polymer network, or any combination thereof. In some embodiments, the coating may comprise, consist of, or consist essentially of at least one of the following: an interpenetrating polymer network (IPN), a semi-interpenetrating polymer network (semi-IPN), a sequential interpenetrating polymer network, a sequential semi-interpenetrating polymer network, a thermoplastic interpenetrating polymer network, an intertwining interpenetrating polymer network, a co-continuous polymer network, an interlocking polymer network, or any combination thereof. In some embodiments, the coating does not comprise phase separated polymers. In some embodiments, the polymer network does not comprise phase separated polymers. In some embodiments, the coating comprises a polymer network, wherein the polymer network comprises at least two polymers, wherein the at least two polymers are immiscible.

In some embodiments, an interpenetrating polymer network may include a polymeric material comprising, consisting of, or consisting essentially of at least two polymers in network form, at least one of which being synthesized, crosslinked, or synthesized and crosslinked in the presence of the other. For example, in some embodiments, the interpenetrating polymer network may comprise, consist of, or consist essentially of two or more polymers in network form, wherein at least one of the polymers is polymerized in the presence of the other polymer. In some embodiments, the interpenetrating polymer network may comprise, consist of, or consist essentially of two or more polymers in network form, wherein at least one of the polymers is crosslinked (e.g., via curing) in the presence of the other polymer. In some embodiments, no covalent bond may be formed between the at least two polymers in network form. In some embodiments, the interpenetrating polymer network does not comprise a mixture or blend of two or more pre-formed polymer networks. In some embodiments, a property (e.g., a Tear CD property, a MD tensile strength property, etc.) of the interpenetrating polymer network is different from a property of the polymer A, a property of the polymer B, or a property of a mixture of the polymer A and the polymer B, wherein the mixture is not an interpenetrating polymer network.

In some embodiments, a semi-interpenetrating polymer network may include a polymeric material comprising, consisting of, or consisting essentially of at least one polymer in network form and at least one non-network polymer (i.e., a polymer not in network form), the at least one non-network polymer at least partially penetrating the at least one polymer in network form. For example, in some embodiments, the semi-interpenetrating polymer network may comprise, consist of, or consist essentially of at least one polymer in network form, and at least one linear polymer or branched polymer, wherein the at least one linear polymer or branched polymer penetrates at least a portion of the at least one polymer in network form. In some embodiments, the semi-interpenetrating polymer network may be distinguished from the interpenetrating polymer network in that the at least one linear or branched polymer may be separable from the at least one polymer in network form without breaking any chemical bonds. In some embodiments, a property (e.g., a Tear CD property, a MD tensile strength property, etc.) of the semi-interpenetrating polymer network is different from a property of the polymer A, a property of the polymer B, or a property of a mixture of the polymer A and the polymer B, wherein the mixture is not a semi-interpenetrating polymer network.

In some embodiments, at least one of the polymer A, the polymer B, or any combination thereof may comprise, consist of, or consist essentially of an unreacted polymer having crosslinkable polymer chains which are not crosslinked. In some embodiments, at least one of the polymer A, the polymer B, or any combination thereof may comprise, consist of, or consist essentially of a reacted polymer having crosslinked polymer chains. In some embodiments, at least one of the polymer A, the polymer B, or any combination thereof may comprise, consist of, or consist essentially of a reacted polymer having crosslinked polymer chains and an unreacted polymer having crosslinkable polymer chains which are not crosslinked. In some embodiments, at least one of the polymer A, the polymer B, or any combination thereof may comprise, consist of, or consist essentially of a linear polymer. In some embodiments, at least one of the polymer A, the polymer B, or any combination thereof may comprise, consist of, or consist essentially of a branched polymer. In some embodiments, at least one of the polymer A, the polymer B, or any combination thereof may comprise, consist of, or consist essentially of at least one of a linear polymer, a branched polymer, or any combination thereof. In some embodiments, at least one of the polymer A, the polymer B, or any combination thereof is a crosslinked polymer. In some embodiments, the at least one of the polymer A, the polymer B, or any combination thereof is a dispersed phase. For example, in some embodiments, the polymer A is crosslinked and the polymer B is a dispersed phase, wherein the polymer B is not crosslinked. In some embodiments, the polymer A is crosslinked and the polymer B is crosslinked.

In some embodiments, the crosslinked polymer (e.g., the polymer A) is a fully crosslinked polymer. In some embodiments, the crosslinked polymer is a partially crosslinked polymer. In some embodiments, the degree of crosslinking refers to the percentage of polymer chains which are interconnected in a polymer network. In some embodiments, the degree of crosslinking of the crosslinked polymer is 95% to 99%. In some embodiments, the degree of crosslinking of the crosslinked polymer is 90% to 99%. In some embodiments, the degree of crosslinking of the crosslinked polymer is 85% to 99%. In some embodiments, the degree of crosslinking of the crosslinked polymer is 80% to 99%. In some embodiments, the degree of crosslinking of the crosslinked polymer is 75% to 99%. In some embodiments, the degree of crosslinking of the crosslinked polymer is 70% to 99%. In some embodiments, the degree of crosslinking of the crosslinked polymer is 65% to 99%. In some embodiments, the degree of crosslinking of the crosslinked polymer is 60% to 99%. In some embodiments, the degree of crosslinking of the crosslinked polymer is 55% to 99%. In some embodiments, the degree of crosslinking of the crosslinked polymer is 50% to 99%. In some embodiments, the degree of crosslinking of the crosslinked polymer is 45% to 99%. In some embodiments, the degree of crosslinking of the crosslinked polymer is 40% to 99%. In some embodiments, the degree of crosslinking of the crosslinked polymer is 35% to 99%. In some embodiments, the degree of crosslinking of the crosslinked polymer is 30% to 99%. In some embodiments, the degree of crosslinking of the crosslinked polymer is 25% to 99%. In some embodiments, the degree of crosslinking of the crosslinked polymer is 20% to 99%.

In some embodiments, the select property of the coating may comprise, consist of, or consist essentially of a Tear Cross Direction (CD) property. For example, in some embodiments, the coating may have a Tear CD property of at least 1000 g-f. In some embodiments, the coating may have a Tear CD property of at least 1100 g-f. In some embodiments, the coating may have a Tear CD property of at least 1200 g-f. In some embodiments, the coating may have a Tear CD property of at least 1300 g-f. In some embodiments, the coating may have a Tear CD property of at least 1400 g-f. In some embodiments, the coating may have a Tear CD property of at least 1500 g-f. In some embodiments, the coating may have a Tear CD property of at least 1600 g-f. In some embodiments, the coating may have a Tear CD property of at least 1700 g-f. In some embodiments, the coating may have a Tear CD property of at least 1800 g-f. In some embodiments, the coating may have a Tear CD property of at least 1900 g-f. In some embodiments, the coating may have a Tear CD property of at least 2000 g-f. In some embodiments, the coating may have a Tear CD property of at least 2500 g-f. In some embodiments, the Tear CD property may be measured according to ASTM D, as modified by ASTM D228.

In some embodiments, the coating may have a Tear CD property of 1000 g-f to 1100 g-f. In some embodiments, the coating may have a Tear CD property of 1000 g-f to 1200 g-f. In some embodiments, the coating may have a Tear CD property of 1000 g-f to 1300 g-f. In some embodiments, the coating may have a Tear CD property of 1000 g-f to 1400 g-f. In some embodiments, the coating may have a Tear CD property of 1000 g-f to 1500 g-f. In some embodiments, the coating may have a Tear CD property of 1000 g-f to 1600 g-f. In some embodiments, the coating may have a Tear CD property of 1000 g-f to 1700 g-f. In some embodiments, the coating may have a Tear CD property of 1000 g-f to 1800 g-f. In some embodiments, the coating may have a Tear CD property of 1000 g-f to 1900 g-f. In some embodiments, the coating may have a Tear CD property of 1000 g-f to 2000 g-f. In some embodiments, the coating may have a Tear CD property of 1000 g-f to 5000 g-f. In some embodiments, the Tear CD property may be measured according to ASTM D, as modified by ASTM D228.

In some embodiments, the coating may have a Tear CD property of 1000 g-f to 2500 g-f. In some embodiments, the coating may have a Tear CD property of 1100 g-f to 2500 g-f. In some embodiments, the coating may have a Tear CD property of 1200 g-f to 2500 g-f. In some embodiments, the coating may have a Tear CD property of 1300 g-f to 2500 g-f. In some embodiments, the coating may have a Tear CD property of 1400 g-f to 2500 g-f. In some embodiments, the coating may have a Tear CD property of 1500 g-f to 2500 g-f. In some embodiments, the coating may have a Tear CD property of 1600 g-f to 2500 g-f. In some embodiments, the coating may have a Tear CD property of 1700 g-f to 2500 g-f. In some embodiments, the coating may have a Tear CD property of 1800 g-f to 2500 g-f. In some embodiments, the coating may have a Tear CD property of 1900 g-f to 2500 g-f. In some embodiments, the coating may have a Tear CD property of 2000 g-f to 2500 g-f. In some embodiments, the Tear CD property may be measured according to ASTM D, as modified by ASTM D228.

In some embodiments, the coating may have a Tear CD property of 1100 g-f to 2200 g-f. In some embodiments, the coating may have a Tear CD property of 1200 g-f to 1900 g-f. In some embodiments, the coating may have a Tear CD property of 1100 g-f to 1900 g-f. In some embodiments, the coating may have a Tear CD property of 1200 g-f to 1800 g-f. In some embodiments, the coating may have a Tear CD property of 1300 g-f to 1700 g-f. In some embodiments, the coating may have a Tear CD property of 1400 g-f to 1600 g-f. In some embodiments, the Tear CD property may be measured according to ASTM D, as modified by ASTM D228.

In some embodiments, the select property of the coating may comprise, consist of, or consist essentially of a tensile strength (lb-f) property in a machine direction (MD). In some embodiments, the coating may have a MD Tensile Strength property of at least 100 lb-f. In some embodiments, the coating may have a MD Tensile Strength property of at least 110 lb-f. In some embodiments, the coating may have a MD Tensile Strength property of at least 120 lb-f. In some embodiments, the coating may have a MD Tensile Strength property of at least 130 lb-f. In some embodiments, the coating may have a MD Tensile Strength property of at least 140 lb-f. In some embodiments, the coating may have a MD Tensile Strength property of at least 150 lb-f. In some embodiments, the coating may have a MD Tensile Strength property of at least 160 lb-f. In some embodiments, the coating may have a MD Tensile Strength property of at least 170 lb-f. In some embodiments, the coating may have a MD Tensile Strength property of at least 180 lb-f. In some embodiments, the coating may have a MD Tensile Strength property of at least 190 lb-f. In some embodiments, the coating may have a MD Tensile Strength property of at least 200 lb-f. In some embodiments, the coating may have a MD Tensile Strength property of at least 210 lb-f. In some embodiments, the MD Tensile Strength property may be measured according to ASTM 5147.

In some embodiments, the coating may have a MD Tensile Strength property of 100 lb-f to 250 lb-f. In some embodiments, the coating may have a MD Tensile Strength property of 100 lb-f to 240 lb-f. In some embodiments, the coating may have a MD Tensile Strength property of 100 lb-f to 230 lb-f. In some embodiments, the coating may have a MD Tensile Strength property of 100 lb-f to 220 lb-f. In some embodiments, the coating may have a MD Tensile Strength property of 100 lb-f to 210 lb-f. In some embodiments, the coating may have a MD Tensile Strength property of 100 lb-f to 200 lb-f. In some embodiments, the coating may have a MD Tensile Strength property of 100 lb-f to 190 lb-f. In some embodiments, the coating may have a MD Tensile Strength property of 100 lb-f to 180 lb-f. In some embodiments, the coating may have a MD Tensile Strength property of 100 lb-f to 170 lb-f. In some embodiments, the coating may have a MD Tensile Strength property of 100 lb-f to 160 lb-f. In some embodiments, the coating may have a MD Tensile Strength property of 100 lb-f to 150 lb-f. In some embodiments, the coating may have a MD Tensile Strength property of 100 lb-f to 140 lb-f. In some embodiments, the coating may have a MD Tensile Strength property of 100 lb-f to 130 lb-f. In some embodiments, the coating may have a MD Tensile Strength property of 100 lb-f to 120 lb-f. In some embodiments, the coating may have a MD Tensile Strength property of 100 lb-f to 110 lb-f.

In some embodiments, the coating may have a MD Tensile Strength property of 110 lb-f to 220 lb-f. In some embodiments, the coating may have a MD Tensile Strength property of 120 lb-f to 220 lb-f. In some embodiments, the coating may have a MD Tensile Strength property of 130 lb-f to 220 lb-f. In some embodiments, the coating may have a MD Tensile Strength property of 140 lb-f to 220 lb-f. In some embodiments, the coating may have a MD Tensile Strength property of 150 lb-f to 220 lb-f. In some embodiments, the coating may have a MD Tensile Strength property of 160 lb-f to 220 lb-f. In some embodiments, the coating may have a MD Tensile Strength property of 170 lb-f to 220 lb-f. In some embodiments, the coating may have a MD Tensile Strength property of 180 lb-f to 220 lb-f. In some embodiments, the coating may have a MD Tensile Strength property of 190 lb-f to 220 lb-f. In some embodiments, the coating may have a MD Tensile Strength property of 200 lb-f to 220 lb-f. In some embodiments, the coating may have a MD Tensile Strength property of 210 lb-f to 220 lb-f. In some embodiments, the MD Tensile Strength property may be measured according to ASTM 5147.

In some embodiments, the coating may have a MD Tensile Strength property of 160 lb-f to 215 lb-f. In some embodiments, the coating may have a MD Tensile Strength property of 170 lb-f to 215 lb-f. In some embodiments, the coating may have a MD Tensile Strength property of 180 lb-f to 215 lb-f. In some embodiments, the coating may have a MD Tensile Strength property of 190 lb-f to 215 lb-f. In some embodiments, the coating may have a MD Tensile Strength property of 200 lb-f to 215 lb-f. In some embodiments, the coating may have a MD Tensile Strength property of 160 lb-f to 190 lb-f. In some embodiments, the coating may have a MD Tensile Strength property of 170 lb-f to 190 lb-f. In some embodiments, the MD Tensile Strength property may be measured according to ASTM 5147.

In some embodiments, the coating may further comprise, further consist of, or further consist essentially of asphalt.

In some embodiments, for example, the coating comprises 0.1% to 49% by weight of asphalt based on the total weight of the coating. In some embodiments, the coating comprises 0.5% to 49% by weight of asphalt based on the total weight of the coating. In some embodiments, the coating comprises 1% to 49% by weight of asphalt based on the total weight of the coating. In some embodiments, the coating comprises 2% to 49% by weight of asphalt based on the total weight of the coating. In some embodiments, the coating comprises 3% to 49% by weight of asphalt based on the total weight of the coating. In some embodiments, the coating comprises 4% to 49% by weight of asphalt based on the total weight of the coating. In some embodiments, the coating comprises 5% to 49% by weight of asphalt based on the total weight of the coating. In some embodiments, the coating comprises 10% to 49% by weight of asphalt based on the total weight of the coating. In some embodiments, the coating comprises 15% to 49% by weight of asphalt based on the total weight of the coating. In some embodiments, the coating comprises 20% to 49% by weight of asphalt based on the total weight of the coating. In some embodiments, the coating comprises 25% to 49% by weight of asphalt based on the total weight of the coating. In some embodiments, the coating comprises 30% to 49% by weight of asphalt based on the total weight of the coating. In some embodiments, the coating comprises 40% to 49% by weight of asphalt based on the total weight of the coating. In some embodiments, the coating comprises 0.1% to 40% by weight of asphalt based on the total weight of the coating. In some embodiments, the coating comprises 0.5% to 40% by weight of asphalt based on the total weight of the coating. In some embodiments, the coating comprises 1% to 40% by weight of asphalt based on the total weight of the coating. In some embodiments, the coating comprises 2% to 40% by weight of asphalt based on the total weight of the coating. In some embodiments, the coating comprises 3% to 40% by weight of asphalt based on the total weight of the coating. In some embodiments, the coating comprises 4% to 40% by weight of asphalt based on the total weight of the coating. In some embodiments, the coating comprises 5% to 40% by weight of asphalt based on the total weight of the coating. In some embodiments, the coating comprises 10% to 40% by weight of asphalt based on the total weight of the coating. In some embodiments, the coating comprises 15% to 40% by weight of asphalt based on the total weight of the coating. In some embodiments, the coating comprises 20% to 40% by weight of asphalt based on the total weight of the coating. In some embodiments, the coating comprises 25% to 40% by weight of asphalt based on the total weight of the coating. In some embodiments, the coating comprises 30% to 40% by weight of asphalt based on the total weight of the coating. In some embodiments, the coating comprises 0.1% to 30% by weight of asphalt based on the total weight of the coating. In some embodiments, the coating comprises 0.5% to 30% by weight of asphalt based on the total weight of the coating. In some embodiments, the coating comprises 1% to 30% by weight of asphalt based on the total weight of the coating. In some embodiments, the coating comprises 2% to 30% by weight of asphalt based on the total weight of the coating. In some embodiments, the coating comprises 3% to 30% by weight of asphalt based on the total weight of the coating. In some embodiments, the coating comprises 4% to 30% by weight of asphalt based on the total weight of the coating. In some embodiments, the coating comprises 5% to 30% by weight of asphalt based on the total weight of the coating. In some embodiments, the coating comprises 10% to 30% by weight of asphalt based on the total weight of the coating. In some embodiments, the coating comprises 15% to 30% by weight of asphalt based on the total weight of the coating. In some embodiments, the coating comprises 20% to 30% by weight of asphalt based on the total weight of the coating. In some embodiments, the coating comprises 25% to 30% by weight of asphalt based on the total weight of the coating. In some embodiments, the coating comprises 0.1% to 25% by weight of asphalt based on the total weight of the coating. In some embodiments, the coating comprises 0.5% to 25% by weight of asphalt based on the total weight of the coating. In some embodiments, the coating comprises 1% to 25% by weight of asphalt based on the total weight of the coating. In some embodiments, the coating comprises 2% to 25% by weight of asphalt based on the total weight of the coating. In some embodiments, the coating comprises 3% to 25% by weight of asphalt based on the total weight of the coating. In some embodiments, the coating comprises 4% to 25% by weight of asphalt based on the total weight of the coating. In some embodiments, the coating comprises 5% to 25% by weight of asphalt based on the total weight of the coating. In some embodiments, the coating comprises 10% to 25% by weight of asphalt based on the total weight of the coating. In some embodiments, the coating comprises 15% to 25% by weight of asphalt based on the total weight of the coating. In some embodiments, the coating comprises 20% to 25% by weight of asphalt based on the total weight of the coating. In some embodiments, the coating comprises 0.1% to 20% by weight of asphalt based on the total weight of the coating. In some embodiments, the coating comprises 0.5% to 20% by weight of asphalt based on the total weight of the coating. In some embodiments, the coating comprises 1% to 20% by weight of asphalt based on the total weight of the coating. In some embodiments, the coating comprises 2% to 20% by weight of asphalt based on the total weight of the coating. In some embodiments, the coating comprises 3% to 20% by weight of asphalt based on the total weight of the coating. In some embodiments, the coating comprises 4% to 20% by weight of asphalt based on the total weight of the coating. In some embodiments, the coating comprises 5% to 20% by weight of asphalt based on the total weight of the coating. In some embodiments, the coating comprises 10% to 20% by weight of asphalt based on the total weight of the coating. In some embodiments, the coating comprises 15% to 20% by weight of asphalt based on the total weight of the coating. In some embodiments, the coating comprises 0.1% to 15% by weight of asphalt based on the total weight of the coating. In some embodiments, the coating comprises 0.5% to 15% by weight of asphalt based on the total weight of the coating. In some embodiments, the coating comprises 1% to 15% by weight of asphalt based on the total weight of the coating. In some embodiments, the coating comprises 2% to 15% by weight of asphalt based on the total weight of the coating. In some embodiments, the coating comprises 3% to 15% by weight of asphalt based on the total weight of the coating. In some embodiments, the coating comprises 4% to 15% by weight of asphalt based on the total weight of the coating. In some embodiments, the coating comprises 5% to 15% by weight of asphalt based on the total weight of the coating. In some embodiments, the coating comprises 10% to 15% by weight of asphalt based on the total weight of the coating. In some embodiments, the coating comprises 0.1% to 10% by weight of asphalt based on the total weight of the coating. In some embodiments, the coating comprises 0.5% to 10% by weight of asphalt based on the total weight of the coating. In some embodiments, the coating comprises 1% to 10% by weight of asphalt based on the total weight of the coating. In some embodiments, the coating comprises 2% to 10% by weight of asphalt based on the total weight of the coating. In some embodiments, the coating comprises 3% to 10% by weight of asphalt based on the total weight of the coating. In some embodiments, the coating comprises 4% to 10% by weight of asphalt based on the total weight of the coating. In some embodiments, the coating comprises 5% to 10% by weight of asphalt based on the total weight of the coating. In some embodiments, the coating comprises 0.1% to 5% by weight of asphalt based on the total weight of the coating. In some embodiments, the coating comprises 0.5% to 5% by weight of asphalt based on the total weight of the coating. In some embodiments, the coating comprises 1% to 5% by weight of asphalt based on the total weight of the coating. In some embodiments, the coating comprises 2% to 5% by weight of asphalt based on the total weight of the coating. In some embodiments, the coating comprises 3% to 5% by weight of asphalt based on the total weight of the coating. In some embodiments, the coating comprises 4% to 5% by weight of asphalt based on the total weight of the coating. In some embodiments, the coating comprises 0.1% to 4% by weight of asphalt based on the total weight of the coating. In some embodiments, the coating comprises 0.5% to 4% by weight of asphalt based on the total weight of the coating. In some embodiments, the coating comprises 1% to 4% by weight of asphalt based on the total weight of the coating. In some embodiments, the coating comprises 2% to 4% by weight of asphalt based on the total weight of the coating. In some embodiments, the coating comprises 3% to 4% by weight of asphalt based on the total weight of the coating. In some embodiments, the coating comprises 0.1% to 3% by weight of asphalt based on the total weight of the coating. In some embodiments, the coating comprises 0.5% to 3% by weight of asphalt based on the total weight of the coating. In some embodiments, the coating comprises 1% to 3% by weight of asphalt based on the total weight of the coating. In some embodiments, the coating comprises 2% to 3% by weight of asphalt based on the total weight of the coating. In some embodiments, the coating comprises 0.1% to 2% by weight of asphalt based on the total weight of the coating. In some embodiments, the coating comprises 0.5% to 2% by weight of asphalt based on the total weight of the coating. In some embodiments, the coating comprises 1% to 2% by weight of asphalt based on the total weight of the coating. In some embodiments, the coating comprises 0.1% to 1% by weight of asphalt based on the total weight of the coating. In some embodiments, the coating comprises 0.5% to 1% by weight of asphalt based on the total weight of the coating. In some embodiments, the coating comprises 0.1% to 0.5% by weight of asphalt based on the total weight of the coating. In some embodiments, the coating may be substantially free of asphalt. For example, in some embodiments, the asphalt may be present in an amount of 0.1% to 5% by weight based on the total weight of the coating. In some embodiments, the asphalt may be present in an amount of 5% or less by weight based on the total weight of the coating. In some embodiments, the coating may be free of asphalt. For example, in some embodiments, the coating does not comprise asphalt.

In some embodiments, the roofing material may further comprise a surface protective coating on a surface of the coating. For example, in some embodiments, the surface protective coating may comprise a plurality of roofing granules on a surface of the coating.

In some embodiments, the roofing granule may comprise, consist of, or consist essentially of at least one of fines, granules, sand, metal flakes, reflective granules, ceramic granules, clay granules, composite particles comprising filled plastics (e.g., composite particles made with highly filled plastics), polymer-based granules, or any combination thereof. In some embodiments, the roofing granule may comprise, consist of, or consist essentially of at least one of greenstone, nephelene syenite, common gravel, slate, gannister, quartz, quartzite, greystone, argillite, coal slag, copper slag, nickel slag, ceramic grog, talc, granite, siliceous sand, andesite, porphyry, marble, syenite, rhyolite, diabase, quartz, slate, basalt, sandstone, marine shell, a material derived from a recycled manufactured good (e.g., at least one of a brick, a concrete, a porcelain, or any combination thereof), or any combination thereof. In some embodiments, the roofing granule may comprise a shape of or may comprise a shape resembling a sphere, a flake, a plate, a rod, or any combination thereof.

In some embodiments, a thickness of the coating on the substrate is 20 mils to 200 mils. In some embodiments, the thickness of the coating on the substrate is 20 mils to 150 mils. In some embodiments, the thickness of the coating on the substrate is 20 mils to 100 mils. In some embodiments, the thickness of the coating on the substrate is 20 mils to 75 mils. In some embodiments, the thickness of the coating on the substrate is 20 mils to 60 mils. In some embodiments, the thickness of the coating on the substrate is 20 mils to 50 mils. In some embodiments, the thickness of the coating on the substrate is 20 mils to 40 mils. In some embodiments, the thickness of the coating on the substrate is 20 mils to 30 mils. In some embodiments, the thickness of the coating on the substrate is 30 mils to 200 mils. In some embodiments, the thickness of the coating on the substrate is 30 mils to 150 mils. In some embodiments, the thickness of the coating on the substrate is 30 mils to 100 mils. In some embodiments, the thickness of the coating on the substrate is 30 mils to 75 mils. In some embodiments, the thickness of the coating on the substrate is 30 mils to 60 mils. In some embodiments, the thickness of the coating on the substrate is 30 mils to 50 mils. In some embodiments, the thickness of the coating on the substrate is 30 mils to 40 mils. In some embodiments, the thickness of the coating on the substrate is 40 mils to 200 mils. In some embodiments, the thickness of the coating on the substrate is 40 mils to 150 mils. In some embodiments, the thickness of the coating on the substrate is 40 mils to 100 mils. In some embodiments, the thickness of the coating on the substrate is 40 mils to 75 mils. In some embodiments, the thickness of the coating on the substrate is 40 mils to 60 mils. In some embodiments, the thickness of the coating on the substrate is 40 mils to 50 mils. In some embodiments, the thickness of the coating on the substrate is 50 mils to 200 mils. In some embodiments, the thickness of the coating on the substrate is 50 mils to 150 mils. In some embodiments, the thickness of the coating on the substrate is 50 mils to 100 mils. In some embodiments, the thickness of the coating on the substrate is 50 mils to 75 mils. In some embodiments, the thickness of the coating on the substrate is 50 mils to 60 mils. In some embodiments, the thickness of the coating on the substrate is 60 mils to 200 mils. In some embodiments, the thickness of the coating on the substrate is 60 mils to 150 mils. In some embodiments, the thickness of the coating on the substrate is 60 mils to 100 mils. In some embodiments, the thickness of the coating on the substrate is 60 mils to 75 mils. In some embodiments, the thickness of the coating on the substrate is 75 mils to 200 mils. In some embodiments, the thickness of the coating on the substrate is 75 mils to 150 mils. In some embodiments, the thickness of the coating on the substrate is 75 mils to 100 mils. In some embodiments, the thickness of the coating on the substrate is 100 mils to 200 mils. In some embodiments, the thickness of the coating on the substrate is 100 mils to 150 mils. In some embodiments, the thickness of the coating on the substrate is 150 mils to 200 mils. In some embodiments, the thickness of the coating on the substrate is 60 mils.

In some embodiments, a thickness of the substrate is 20 mils to 200 mils. In some embodiments, the thickness of the substrate is 20 mils to 150 mils. In some embodiments, the thickness of the substrate is 20 mils to 100 mils. In some embodiments, the thickness of the substrate is 20 mils to 75 mils. In some embodiments, the thickness of the substrate is 20 mils to 60 mils. In some embodiments, the thickness of the substrate is 20 mils to 50 mils. In some embodiments, the thickness of the substrate is 20 mils to 40 mils. In some embodiments, the thickness of the substrate is 20 mils to 30 mils. In some embodiments, the thickness of the substrate is 30 mils to 200 mils. In some embodiments, the thickness of the substrate is 30 mils to 150 mils. In some embodiments, the thickness of the substrate is 30 mils to 100 mils. In some embodiments, the thickness of the substrate is 30 mils to 75 mils. In some embodiments, the thickness of the substrate is 30 mils to 60 mils. In some embodiments, the thickness of the substrate is 30 mils to 50 mils. In some embodiments, the thickness of the substrate is 30 mils to 40 mils. In some embodiments, the thickness of the substrate is 40 mils to 200 mils. In some embodiments, the thickness of the substrate is 40 mils to 150 mils. In some embodiments, the thickness of the substrate is 40 mils to 100 mils. In some embodiments, the thickness of the substrate is 40 mils to 75 mils. In some embodiments, the thickness of the substrate is 40 mils to 60 mils. In some embodiments, the thickness of the substrate is 40 mils to 50 mils. In some embodiments, the thickness of the substrate is 50 mils to 200 mils. In some embodiments, the thickness of the substrate is 50 mils to 150 mils. In some embodiments, the thickness of the substrate is 50 mils to 100 mils. In some embodiments, the thickness of the substrate is 50 mils to 75 mils. In some embodiments, the thickness of the substrate is 50 mils to 60 mils. In some embodiments, the thickness of the substrate is 60 mils to 200 mils. In some embodiments, the thickness of the substrate is 60 mils to 150 mils. In some embodiments, the thickness of the substrate is 60 mils to 100 mils. In some embodiments, the thickness of the substrate is 60 mils to 75 mils. In some embodiments, the thickness of the substrate is 75 mils to 200 mils. In some embodiments, the thickness of the substrate is 75 mils to 150 mils. In some embodiments, the thickness of the substrate is 75 mils to 100 mils. In some embodiments, the thickness of the substrate is 100 mils to 200 mils. In some embodiments, the thickness of the substrate is 100 mils to 150 mils. In some embodiments, the thickness of the substrate is 150 mils to 200 mils. In some embodiments, the thickness of the substrate is 60 mils. In some embodiments, the thickness of the substrate is 6 mils to 60 mils.

In some embodiments, a thickness of the roofing material is at least 20 mils. In some embodiments, a thickness of the roofing material is at least 30 mils. In some embodiments, a thickness of the roofing material is at least 40 mils. In some embodiments, a thickness of the roofing material is at least 50 mils. In some embodiments, a thickness of the roofing material is at least 60 mils. In some embodiments, a thickness of the roofing material is at least 70 mils. In some embodiments, a thickness of the roofing material is at least 80 mils. In some embodiments, a thickness of the roofing material is at least 90 mils. In some embodiments, a thickness of the roofing material is at least 100 mils. In some embodiments, a thickness of the roofing material is at least 110 mils. In some embodiments, a thickness of the roofing material is at least 120 mils. In some embodiments, a thickness of the roofing material is at least 130 mils. In some embodiments, a thickness of the roofing material is at least 140 mils. In some embodiments, a thickness of the roofing material is at least 150 mils. In some embodiments, a thickness of the roofing material is at least 160 mils. In some embodiments, a thickness of the roofing material is at least 170 mils. In some embodiments, a thickness of the roofing material is at least 180 mils. In some embodiments, a thickness of the roofing material is at least 190 mils. In some embodiments, a thickness of the roofing material is at least 200 mils. In some embodiments, a thickness of the roofing material is at least 250 mils. In some embodiments, a thickness of the roofing material is at least 300 mils. In some embodiments, a thickness of the roofing material is at least 350 mils. In some embodiments, a thickness of the roofing material is at least 400 mils. In some embodiments, a thickness of the roofing material is at least 450 mils. In some embodiments, the thickness of the roofing material is less than 500 mils. In some embodiments, the thickness of the roofing material is less than 450 mils. In some embodiments, the thickness of the roofing material is less than 400 mils. In some embodiments, the thickness of the roofing material is less than 350 mils. In some embodiments, the thickness of the roofing material is less than 300 mils. In some embodiments, the thickness of the roofing material is less than 250 mils. In some embodiments, the thickness of the roofing material is less than 200 mils. In some embodiments, the thickness of the roofing material is less than 150 mils. In some embodiments, the thickness of the coating on the substrate is measured according to ASTM D5147.

In some embodiments, the thickness of the roofing material is 20 mils to 500 mils. In some embodiments, the thickness of the roofing material is 30 mils to 500 mils. In some embodiments, the thickness of the roofing material is 40 mils to 500 mils. In some embodiments, the thickness of the roofing material is 50 mils to 500 mils. In some embodiments, the thickness of the roofing material is 50 mils to 475 mils. In some embodiments, the thickness of the roofing material is 50 mils to 450 mils. In some embodiments, the thickness of the roofing material is 50 mils to 425 mils. In some embodiments, the thickness of the roofing material is 50 mils to 400 mils. In some embodiments, the thickness of the roofing material is 50 mils to 375 mils. In some embodiments, the thickness of the roofing material is 50 mils to 350 mils. In some embodiments, the thickness of the roofing material is 50 mils to 325 mils. In some embodiments, the thickness of the roofing material is 50 mils to 300 mils. In some embodiments, the thickness of the roofing material is 50 mils to 275 mils. In some embodiments, the thickness of the roofing material is 50 mils to 250 mils. In some embodiments, the thickness of the roofing material is 50 mils to 200 mils. In some embodiments, the thickness of the coating on the substrate is measured according to ASTM D5147.

In some embodiments, the roofing shingle having a Tear Cross Direction (CD) property. For example, in some embodiments, the roofing shingle may have a Tear CD property of at least 1000 g-f. In some embodiments, the roofing shingle may have a Tear CD property of at least 1100 g-f. In some embodiments, the roofing shingle may have a Tear CD property of at least 1200 g-f. In some embodiments, the roofing shingle may have a Tear CD property of at least 1300 g-f. In some embodiments, the roofing shingle may have a Tear CD property of at least 1400 g-f. In some embodiments, the roofing shingle may have a Tear CD property of at least 1500 g-f. In some embodiments, the roofing shingle may have a Tear CD property of at least 1600 g-f. In some embodiments, the roofing shingle may have a Tear CD property of at least 1700 g-f. In some embodiments, the roofing shingle may have a Tear CD property of at least 1800 g-f. In some embodiments, the roofing shingle may have a Tear CD property of at least 1900 g-f. In some embodiments, the roofing shingle may have a Tear CD property of at least 2000 g-f. In some embodiments, the roofing shingle may have a Tear CD property of at least 2500 g-f. In some embodiments, the Tear CD property may be measured according to ASTM D, as modified by ASTM D228.

In some embodiments, the roofing shingle may have a Tear CD property of 1000 g-f to 1100 g-f. In some embodiments, the roofing shingle may have a Tear CD property of 1000 g-f to 1200 g-f. In some embodiments, the roofing shingle may have a Tear CD property of 1000 g-f to 1300 g-f. In some embodiments, the roofing shingle may have a Tear CD property of 1000 g-f to 1400 g-f. In some embodiments, the roofing shingle may have a Tear CD property of 1000 g-f to 1500 g-f. In some embodiments, the roofing shingle may have a Tear CD property of 1000 g-f to 1600 g-f. In some embodiments, the roofing shingle may have a Tear CD property of 1000 g-f to 1700 g-f. In some embodiments, the roofing shingle may have a Tear CD property of 1000 g-f to 1800 g-f. In some embodiments, the roofing shingle may have a Tear CD property of 1000 g-f to 1900 g-f. In some embodiments, the roofing shingle may have a Tear CD property of 1000 g-f to 2000 g-f. In some embodiments, the roofing shingle may have a Tear CD property of 1000 g-f to 5000 g-f. In some embodiments, the Tear CD property may be measured according to ASTM D, as modified by ASTM D228.

In some embodiments, the roofing shingle may have a Tear CD property of 1000 g-f to 2500 g-f. In some embodiments, the roofing shingle may have a Tear CD property of 1100 g-f to 2500 g-f. In some embodiments, the roofing shingle may have a Tear CD property of 1200 g-f to 2500 g-f. In some embodiments, the roofing shingle may have a Tear CD property of 1300 g-f to 2500 g-f. In some embodiments, the roofing shingle may have a Tear CD property of 1400 g-f to 2500 g-f. In some embodiments, the roofing shingle may have a Tear CD property of 1500 g-f to 2500 g-f. In some embodiments, the roofing shingle may have a Tear CD property of 1600 g-f to 2500 g-f. In some embodiments, the roofing shingle may have a Tear CD property of 1700 g-f to 2500 g-f. In some embodiments, the roofing shingle may have a Tear CD property of 1800 g-f to 2500 g-f. In some embodiments, the roofing shingle may have a Tear CD property of 1900 g-f to 2500 g-f. In some embodiments, the roofing shingle may have a Tear CD property of 2000 g-f to 2500 g-f. In some embodiments, the Tear CD property may be measured according to ASTM D, as modified by ASTM D228.

In some embodiments, the roofing shingle may have a Tear CD property of 1100 g-f to 2200 g-f. In some embodiments, the roofing shingle may have a Tear CD property of 1200 g-f to 1900 g-f. In some embodiments, the roofing shingle may have a Tear CD property of 1100 g-f to 1900 g-f. In some embodiments, the roofing shingle may have a Tear CD property of 1200 g-f to 1800 g-f. In some embodiments, the roofing shingle may have a Tear CD property of 1300 g-f to 1700 g-f. In some embodiments, the roofing shingle may have a Tear CD property of 1400 g-f to 1600 g-f. In some embodiments, the Tear CD property may be measured according to ASTM D, as modified by ASTM D228.

In some embodiments, the roofing shingle having a tensile strength (lb-f) property in a machine direction (MD). In some embodiments, the roofing shingle may have a MD Tensile Strength property of at least 100 lb-f. In some embodiments, the roofing shingle may have a MD Tensile Strength property of at least 110 lb-f. In some embodiments, the roofing shingle may have a MD Tensile Strength property of at least 120 lb-f. In some embodiments, the roofing shingle may have a MD Tensile Strength property of at least 130 lb-f. In some embodiments, the roofing shingle may have a MD Tensile Strength property of at least 140 lb-f. In some embodiments, the roofing shingle may have a MD Tensile Strength property of at least 150 lb-f. In some embodiments, the roofing shingle may have a MD Tensile Strength property of at least 160 lb-f. In some embodiments, the roofing shingle may have a MD Tensile Strength property of at least 170 lb-f. In some embodiments, the roofing shingle may have a MD Tensile Strength property of at least 180 lb-f. In some embodiments, the roofing shingle may have a MD Tensile Strength property of at least 190 lb-f. In some embodiments, the roofing shingle may have a MD Tensile Strength property of at least 200 lb-f. In some embodiments, the roofing shingle may have a MD Tensile Strength property of at least 210 lb-f. In some embodiments, the MD Tensile Strength property may be measured according to ASTM 5147.

In some embodiments, the roofing shingle may have a MD Tensile Strength property of 100 lb-f to 250 lb-f. In some embodiments, the roofing shingle may have a MD Tensile Strength property of 100 lb-f to 240 lb-f. In some embodiments, the roofing shingle may have a MD Tensile Strength property of 100 lb-f to 230 lb-f. In some embodiments, the roofing shingle may have a MD Tensile Strength property of 100 lb-f to 220 lb-f. In some embodiments, the roofing shingle may have a MD Tensile Strength property of 100 lb-f to 210 lb-f. In some embodiments, the roofing shingle may have a MD Tensile Strength property of 100 lb-f to 200 lb-f. In some embodiments, the roofing shingle may have a MD Tensile Strength property of 100 lb-f to 190 lb-f. In some embodiments, the roofing shingle may have a MD Tensile Strength property of 100 lb-f to 180 lb-f. In some embodiments, the roofing shingle may have a MD Tensile Strength property of 100 lb-f to 170 lb-f. In some embodiments, the roofing shingle may have a MD Tensile Strength property of 100 lb-f to 160 lb-f. In some embodiments, the roofing shingle may have a MD Tensile Strength property of 100 lb-f to 150 lb-f. In some embodiments, the roofing shingle may have a MD Tensile Strength property of 100 lb-f to 140 lb-f. In some embodiments, the roofing shingle may have a MD Tensile Strength property of 100 lb-f to 130 lb-f. In some embodiments, the roofing shingle may have a MD Tensile Strength property of 100 lb-f to 120 lb-f. In some embodiments, the roofing shingle may have a MD Tensile Strength property of 100 lb-f to 110 lb-f. In some embodiments, the MD Tensile Strength property may be measured according to ASTM 5147.

In some embodiments, the roofing shingle may have a MD Tensile Strength property of 110 lb-f to 220 lb-f. In some embodiments, the roofing shingle may have a MD Tensile Strength property of 120 lb-f to 220 lb-f. In some embodiments, the roofing shingle may have a MD Tensile Strength property of 130 lb-f to 220 lb-f. In some embodiments, the roofing shingle may have a MD Tensile Strength property of 140 lb-f to 220 lb-f. In some embodiments, the roofing shingle may have a MD Tensile Strength property of 150 lb-f to 220 lb-f. In some embodiments, the roofing shingle may have a MD Tensile Strength property of 160 lb-f to 220 lb-f. In some embodiments, the roofing shingle may have a MD Tensile Strength property of 170 lb-f to 220 lb-f. In some embodiments, the roofing shingle may have a MD Tensile Strength property of 180 lb-f to 220 lb-f. In some embodiments, the roofing shingle may have a MD Tensile Strength property of 190 lb-f to 220 lb-f. In some embodiments, the roofing shingle may have a MD Tensile Strength property of 200 lb-f to 220 lb-f. In some embodiments, the roofing shingle may have a MD Tensile Strength property of 210 lb-f to 220 lb-f. In some embodiments, the MD Tensile Strength property may be measured according to ASTM 5147.

In some embodiments, the roofing shingle may have a MD Tensile Strength property of 160 lb-f to 215 lb-f. In some embodiments, the roofing shingle may have a MD Tensile Strength property of 170 lb-f to 215 lb-f. In some embodiments, the roofing shingle may have a MD Tensile Strength property of 180 lb-f to 215 lb-f. In some embodiments, the roofing shingle may have a MD Tensile Strength property of 190 lb-f to 215 lb-f. In some embodiments, the roofing shingle may have a MD Tensile Strength property of 200 lb-f to 215 lb-f. In some embodiments, the roofing shingle may have a MD Tensile Strength property of 160 lb-f to 190 lb-f. In some embodiments, the roofing shingle may have a MD Tensile Strength property of 170 lb-f to 190 lb-f. In some embodiments, the MD Tensile Strength property may be measured according to ASTM 5147.

In some embodiments, a roofing system is provided. In some embodiments, the roofing system comprises a roofing substrate. In some embodiments, the roofing system comprises a plurality of roofing shingles on the roofing substrate. In some embodiments, each roofing shingle of the plurality of roofing shingles comprises a substrate, and a coating on the substrate. In some embodiments, the coating comprises 5% to 98% by weight of a polymeric material based on a total weight of the coating. In some embodiments, the polymeric material comprises a polymer A and a polymer B. In some embodiments, the polymer A and the polymer B are different. In some embodiments, the polymer A is crosslinked. In some embodiments, the polymer A and the polymer B form at least one of an interpenetrating polymer network, a semi-interpenetrating polymer network, or any combination thereof. In some embodiments, the coating comprises 2% to 95% by weight of at least one filler based on the total weight of the coating. In some embodiments, each roofing shingle of the plurality of roofing shingles having a Tear CD property of at least 1000 g-f, as measured according to ASTM D1922, as modified by ASTM D228.

Figure 3:
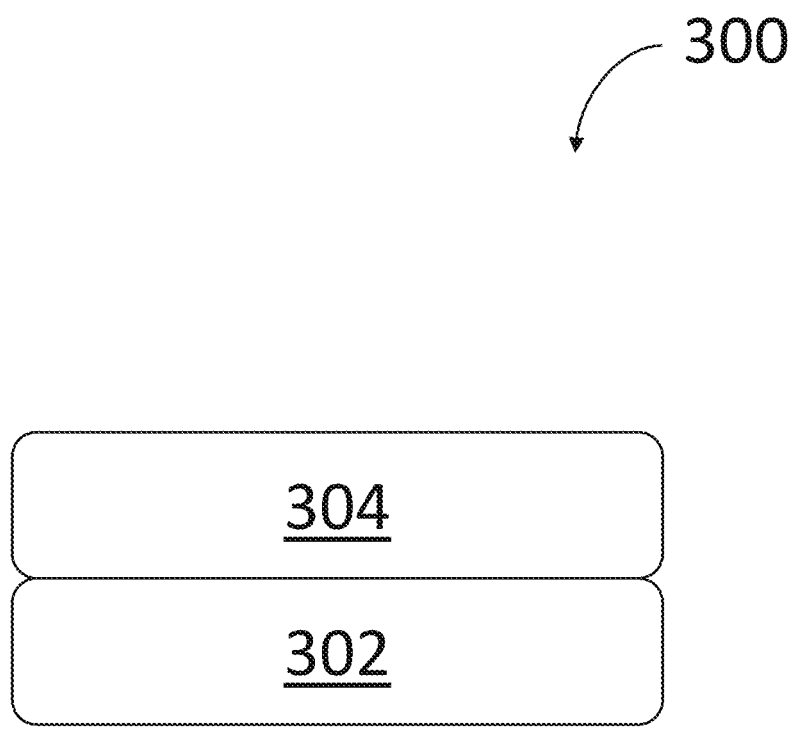
FIG. 3 is a schematic diagram of a roofing material, according to some embodiments.

A non-limiting example of a roofing material is shown in FIG. 3 according to some embodiments. As shown in FIG. 3, in some embodiments, the roofing material may comprise, consist of, or consist essentially of a substrate 302 and a coating 304 on the substrate 302.

Figure 4:
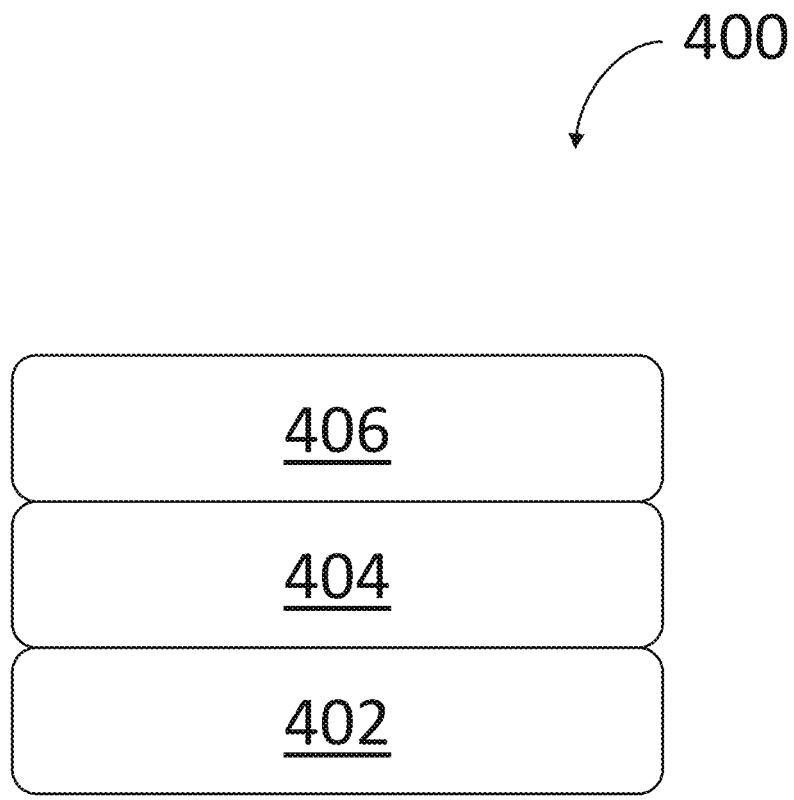
FIG. 4 is a schematic diagram of a roofing material, according to some embodiments.

A non-limiting example of a roofing material is shown in FIG. 4 according to some embodiments. As shown in FIG. 4, in some embodiments, the roofing material may comprise, consist of, or consist essentially of a substrate 402, a coating 404 on the substrate 402, and a plurality of roofing granules 406 on a surface of the coating 404.

Some embodiments of the present disclosure relate to a method, such as, for example and without limitation, a method of preparing a roofing material, a method of preparing a roofing shingle, a method of preparing a coating, a method of preparing a coating on a substrate, and the like.

Figure 5:
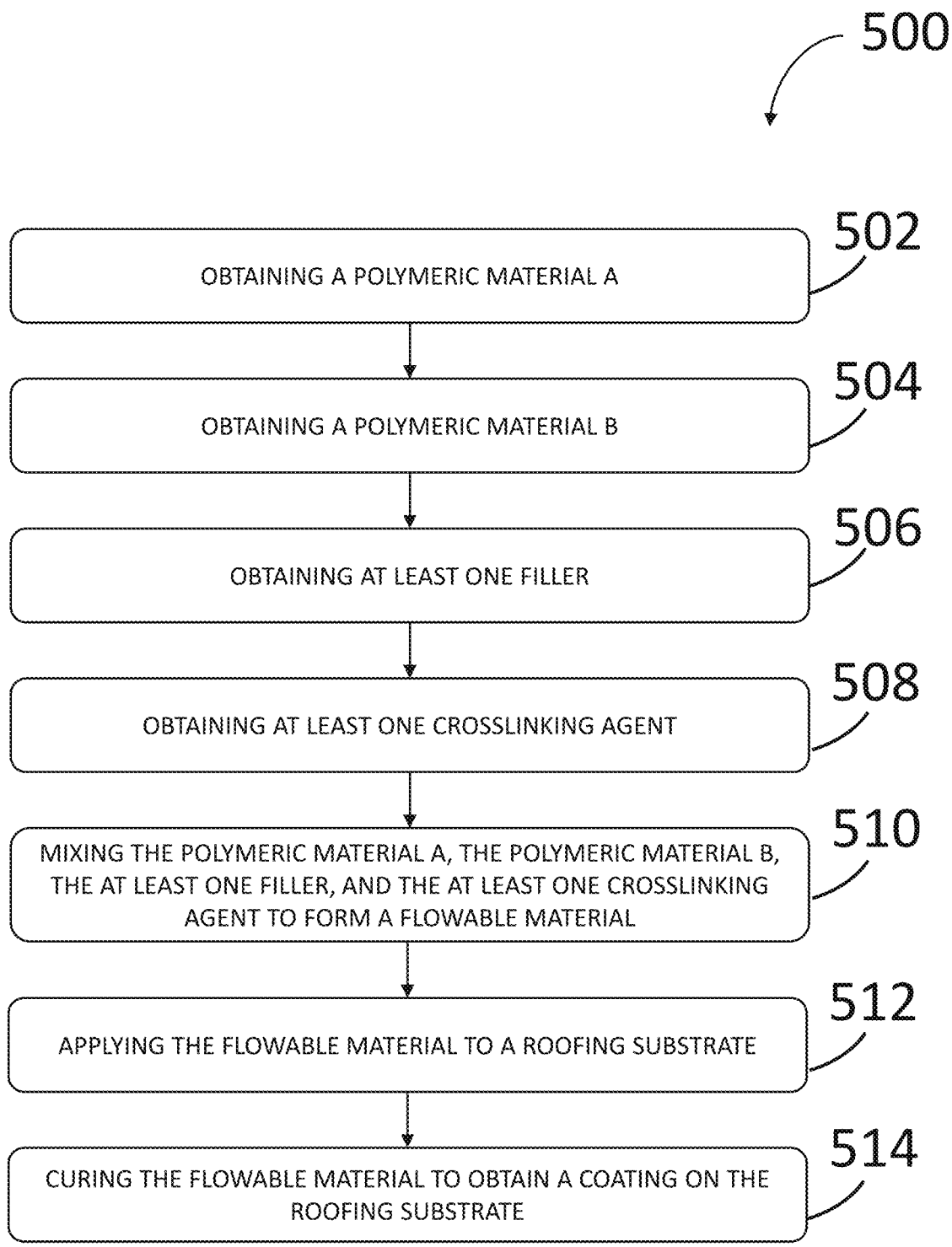
FIG. 5 is a flowchart of a method for preparing a roofing material, according to some embodiments.

A non-limiting example of a method for preparing a roofing material is shown in FIG. 5 according to some embodiments. As shown in FIG. 5, the method 500 may comprise, consist of, or consist essentially of one or more of the following steps: a step 502 of obtaining a polymeric material A; a step 504 of obtaining a polymeric material B; a step 506 of obtaining at least one filler; a step 508 of obtaining at least one crosslinking agent; a step 510 of mixing at least one of the polymeric material A, the polymeric material B, the at least one filler, the at least one crosslinking agent, or any combination thereof to form a flowable material; a step 512 of applying the flowable material to a roofing substrate; and a step 514 of curing the flowable material to obtain a coating on the roofing substrate.

In some embodiments, the method 500 may further comprise polymerizing at least one of the polymeric material A, the polymeric material B, or any combination thereof. In some embodiments, the method 500 may further comprise obtaining an asphalt, mixing the asphalt with at least one of the polymeric material A, the polymeric material B, the at least one filler, the at least one curing agent, or any combination thereof to form the flowable material.

Step 502 may comprise, consist of, or consist essentially of obtaining the polymeric material A. In some embodiments, the polymeric material A may be chosen from any of the polymers disclosed herein or any precursor to the polymers disclosed herein. For example, in some embodiments, the polymeric material A may comprise, consist of, or consist essentially of a monomer of the polymer A; an oligomer of the polymer A; a pre-polymer of the polymer A; the polymer A; or any combination thereof, any one or more of which may be crosslinkable, crosslinked, uncrosslinked, or any combination thereof.

Step 504 may comprise, consist of, or consist essentially of obtaining the polymeric material B. In some embodiments, the polymeric material B may be chosen from any of the polymer Bs disclosed herein or any precursor to the polymer Bs disclosed herein. In some embodiments, the polymeric material B may comprise, consist of, or consist essentially of a monomer of the polymer B; an oligomer of the polymer B; a pre-polymer of the polymer B; the polymer B; or any combination thereof, any one or more of which may be crosslinkable, crosslinked, uncrosslinked, or any combination thereof.

Step 506 may comprise, consist of, or consist essentially of obtaining at least one filler. In some embodiments, the at least one filler may comprise, consist of, or consist essentially any of the fillers of the fillers disclosed herein.

Step 508 may comprise, consist of, or consist essentially of obtaining the at least one crosslinking agent. In some embodiments, the at least one crosslinking agent may be reactive with one of the polymeric material A or the polymeric material B. For example, in some embodiments, the at least one crosslinking agent may react with the polymeric material A to form crosslinks between polymer chains of the polymer A. In some embodiments, the at least one crosslinking agent may not react with the polymer B or, if the at least one crosslinking agent reacts with the polymer B, such reaction is not detectable or is otherwise negligible. In some embodiments, the at least one crosslinking agent may react with the polymeric material B to form crosslinks between polymer chains of the polymer B. In some embodiments, the at least one crosslinking agent may not react with the polymer A or, if the at least one crosslinking agent reacts with the polymer A, such reaction is not detectable or is otherwise negligible. In some embodiments, the at least one crosslinking agent may react with the polymeric material A and the polymeric material B to form crosslinks between the polymer chains of the polymer A and the polymer B. Non-limiting examples of the at least one crosslinking agent include at least one of phenolic resins, amino resins, epoxy resins, triglycidyl isocyanurate, beta-hydroxy (alkyl) amides, alkylated carbamates, (meth)acrylates, isocyanates, blocked isocyanates, polyacids, anhydrides, organometallic acid-functional materials, polyamines, polyamides, aminoplasts, carbodiimides, oxazolines, or any combination thereof.

In some embodiments, the step 508 may employ at least one reactive agent, in addition to or in place of the at least one crosslinking agent. In some embodiments, the at least one reactive agent comprises at least one of an initiator, an activator, or any other component for polymerizing at least one of the polymeric material A, the polymeric material B, or any combination thereof. In some embodiments, the initiator or the activator may be a reactive agent for polymerizing one of the polymeric material A or the polymeric material B. In some embodiments, the polymeric material A may be polymerized in the presence of at least the polymeric material B. In some embodiments, the polymeric material B may be polymerized in the presence of at least the polymeric material A. In some embodiments, at least one of the polymeric material A, the polymeric material B, or any combination thereof is polymerized and crosslinked. In some embodiments, at least one of the polymeric material A, the polymeric material B, or any combination thereof is polymerized, but not crosslinked.

In some embodiments, the step 508 is not performed such that the flowable material does not comprise any crosslinking agent, any reactive agent, or any combination thereof.

Step 510 may comprise, consist of, or consist essentially of mixing at least one of the polymeric material A, the polymeric material B, the at least one filler, the at least one crosslinking agent, or any combination thereof to form a flowable material. In some embodiments, the mixing may comprise, consist of, or consist essentially of at least one of contacting, blending, agitating, stirring, combining, or any combination thereof. In embodiments in which at least one of the polymeric material A, the polymeric material B, or any combination thereof is a polymerizable material—such as, for example, a monomer, a pre-polymer, or an oligomer—the mixing may comprise pre-polymerizing at least one of the polymeric material A, the polymeric material B, or any combination thereof. In some embodiments, the mixing may be performed in a single tank.

In some embodiments, the flowable material comprises 5% to 98% by weight of at least one of the polymeric material A, the polymeric material B, the at least one crosslinking agent, or any combination thereof, based on the total weight of the flowable material. In some embodiments, the flowable material comprises 5% to 95% by weight of at least one of the polymeric material A, the polymeric material B, the at least one crosslinking agent, or any combination thereof, based on the total weight of the flowable material. In some embodiments, the flowable material comprises 5% to 90% by weight of at least one of the polymeric material A, the polymeric material B, the at least one crosslinking agent, or any combination thereof, based on the total weight of the flowable material. In some embodiments, the flowable material comprises 5% to 80% by weight of at least one of the polymeric material A, the polymeric material B, the at least one crosslinking agent, or any combination thereof, based on the total weight of the flowable material. In some embodiments, the flowable material comprises 5% to 70% by weight of at least one of the polymeric material A, the polymeric material B, the at least one crosslinking agent, or any combination thereof, based on the total weight of the flowable material. In some embodiments, the flowable material comprises 5% to 60% by weight of at least one of the polymeric material A, the polymeric material B, the at least one crosslinking agent, or any combination thereof, based on the total weight of the flowable material. In some embodiments, the flowable material comprises 5% to 50% by weight of at least one of the polymeric material A, the polymeric material B, the at least one crosslinking agent, or any combination thereof, based on the total weight of the flowable material. In some embodiments, the flowable material comprises 5% to 40% by weight of at least one of the polymeric material A, the polymeric material B, the at least one crosslinking agent, or any combination thereof, based on the total weight of the flowable material. In some embodiments, the flowable material comprises 5% to 30% by weight of at least one of the polymeric material A, the polymeric material B, the at least one crosslinking agent, or any combination thereof, based on the total weight of the flowable material. In some embodiments, the flowable material comprises 5% to 20% by weight of at least one of the polymeric material A, the polymeric material B, the at least one crosslinking agent, or any combination thereof, based on the total weight of the flowable material. In some embodiments, the flowable material comprises 5% to 10% by weight of at least one of the polymeric material A, the polymeric material B, the at least one crosslinking agent, or any combination thereof, based on the total weight of the flowable material. In some embodiments, the above weight percentages include the at least one reactive agent.

In some embodiments, the flowable material comprises 10% to 98% by weight of at least one of the polymeric material A, the polymeric material B, the at least one crosslinking agent, or any combination thereof, based on the total weight of the flowable material. In some embodiments, the flowable material comprises 20% to 98% by weight of at least one of the polymeric material A, the polymeric material B, the at least one crosslinking agent, or any combination thereof, based on the total weight of the flowable material. In some embodiments, the flowable material comprises 30% to 98% by weight of at least one of the polymeric material A, the polymeric material B, the at least one crosslinking agent, or any combination thereof, based on the total weight of the flowable material. In some embodiments, the flowable material comprises 40% to 98% by weight of at least one of the polymeric material A, the polymeric material B, the at least one crosslinking agent, or any combination thereof, based on the total weight of the flowable material. In some embodiments, the flowable material comprises 50% to 98% by weight of at least one of the polymeric material A, the polymeric material B, the at least one crosslinking agent, or any combination thereof, based on the total weight of the flowable material. In some embodiments, the flowable material comprises 60% to 98% by weight of at least one of the polymeric material A, the polymeric material B, the at least one crosslinking agent, or any combination thereof, based on the total weight of the flowable material. In some embodiments, the flowable material comprises 70% to 98% by weight of at least one of the polymeric material A, the polymeric material B, the at least one s, or any combination thereof, based on the total weight of the flowable material. In some embodiments, the flowable material comprises 80% to 98% by weight of at least one of the polymeric material A, the polymeric material B, the at least one crosslinking agent, or any combination thereof, based on the total weight of the flowable material. In some embodiments, the flowable material comprises 90% to 98% by weight of at least one of the polymeric material A, the polymeric material B, the at least one crosslinking agent, or any combination thereof, based on the total weight of the flowable material. In some embodiments, the above weight percentages include the at least one reactive agent.

In some embodiments, the flowable material comprises 2% to 95% by weight of the at least one filler based on the total weight of the flowable material. In some embodiments, the flowable material comprises 2% to 90% by weight of the at least one filler based on the total weight of the flowable material. In some embodiments, the flowable material comprises 2% to 80% by weight of the at least one filler based on the total weight of the flowable material. In some embodiments, the flowable material comprises 2% to 70% by weight of the at least one filler based on the total weight of the flowable material. In some embodiments, the flowable material comprises 2% to 60% by weight of the at least one filler based on the total weight of the flowable material. In some embodiments, the flowable material comprises 2% to 50% by weight of the at least one filler based on the total weight of the flowable material. In some embodiments, the flowable material comprises 2% to 40% by weight of the at least one filler based on the total weight of the flowable material. In some embodiments, the flowable material comprises 2% to 30% by weight of the at least one filler based on the total weight of the flowable material. In some embodiments, the flowable material comprises 2% to 20% by weight of the at least one filler based on the total weight of the flowable material. In some embodiments, the flowable material comprises 2% to 10% by weight of the at least one filler based on the total weight of the flowable material.

In some embodiments, the flowable material comprises 10% to 95% by weight of the at least one filler based on the total weight of the flowable material. In some embodiments, the flowable material comprises 20% to 95% by weight of the at least one filler based on the total weight of the flowable material. In some embodiments, the flowable material comprises 30% to 95% by weight of the at least one filler based on the total weight of the flowable material. In some embodiments, the flowable material comprises 40% to 95% by weight of the at least one filler based on the total weight of the flowable material. In some embodiments, the flowable material comprises 50% to 95% by weight of the at least one filler based on the total weight of the flowable material. In some embodiments, the flowable material comprises 60% to 95% by weight of the at least one filler based on the total weight of the flowable material. In some embodiments, the flowable material comprises 70% to 95% by weight of the at least one filler based on the total weight of the flowable material. In some embodiments, the flowable material comprises 80% to 95% by weight of the at least one filler based on the total weight of the flowable material. In some embodiments, the flowable material comprises 90% to 95% by weight of the at least one filler based on the total weight of the flowable material.

In some embodiments, the viscosity of the flowable material is 50000 cP or less. In some embodiments, the viscosity of the flowable material is 45000 cP or less. In some embodiments, the viscosity of the flowable material is 40000 cP or less. In some embodiments, the viscosity of the flowable material is 35000 cP or less. In some embodiments, the viscosity of the flowable material is 30000 cP or less. In some embodiments, the viscosity of the flowable material is 25000 cP or less. In some embodiments, the viscosity of the flowable material is 20000 cP or less. In some embodiments, the viscosity of the flowable material is 15000 cP or less. In some embodiments, the viscosity of the flowable material is 10000 cP or less. In some embodiments, the viscosity of the flowable material is 9500 cP or less. In some embodiments, the viscosity of the flowable material is 9000 cP or less. In some embodiments, the viscosity of the flowable material is 8500 cP or less. In some embodiments, the viscosity of the flowable material is 8000 cP or less. In some embodiments, the viscosity of the flowable material is 7500 cP or less. In some embodiments, the viscosity of the flowable material is 7000 cP or less. In some embodiments, the viscosity of the flowable material is 6500 cP or less. In some embodiments, the viscosity of the flowable material is 6000 cP or less. In some embodiments, the viscosity of the flowable material is 5500 cP or less. In some embodiments, the viscosity of the flowable material is 5000 cP or less. In some embodiments, the viscosity of the flowable material is 4500 cP or less. In some embodiments, the viscosity of the flowable material is 4000 cP or less. In some embodiments, the viscosity of the flowable material is 3500 cP or less. In some embodiments, the viscosity of the flowable material is 3000 cP or less. In some embodiments, the viscosity of the flowable material is 2500 cP or less. In some embodiments, the viscosity of the flowable material is 2000 cP or less. In some embodiments, the viscosity may be measured according to ASTM D4402 using a #31 spindle at 400° F.

In some embodiments, the viscosity of the flowable material may be from 100 cP to 50000 cP. In some embodiments, the viscosity of the flowable material may be from 100 cP to 45000 cP. In some embodiments, the viscosity of the flowable material may be from 100 cP to 40000 cP. In some embodiments, the viscosity of the flowable material may be from 100 cP to 35000 cP. In some embodiments, the viscosity of the flowable material may be from 100 cP to 30000 cP. In some embodiments, the viscosity of the flowable material may be from 100 cP to 25000 cP. In some embodiments, the viscosity of the flowable material may be from 100 cP to 20000 cP. In some embodiments, the viscosity of the flowable material may be from 100 cP to 15000 cP. In some embodiments, the viscosity of the flowable material may be from 100 cP to 10000 cP. In some embodiments, the viscosity of the flowable material may be from 100 cP to 9500 cP. In some embodiments, the viscosity of the flowable material may be from 100 cP to 9000 cP. In some embodiments, the viscosity of the flowable material may be from 100 cP to 8500 cP. In some embodiments, the viscosity of the flowable material may be from 100 cP to 8000 cP. In some embodiments, the viscosity of the flowable material may be from 100 cP to 7500 cP. In some embodiments, the viscosity of the flowable material may be from 100 cP to 7000 cP. In some embodiments, the viscosity of the flowable material may be from 100 cP to 6500 cP. In some embodiments, the viscosity of the flowable material may be from 100 cP to 6000 cP. In some embodiments, the viscosity of the flowable material may be from 100 cP to 5500 cP. In some embodiments, the viscosity of the flowable material may be from 100 cP to 5000 cP. In some embodiments, the viscosity of the flowable material may be from 100 cP to 4500 cP. In some embodiments, the viscosity of the flowable material may be from 100 cP to 4000 cP. In some embodiments, the viscosity of the flowable material may be from 100 cP to 3500 cP. In some embodiments, the viscosity of the flowable material may be from 100 cP to 3000 cP. In some embodiments, the viscosity of the flowable material may be from 100 cP to 2500 cP. In some embodiments, the viscosity of the flowable material may be from 100 cP to 2000 cP. In some embodiments, the viscosity of the flowable material may be from 200 cP to 2000 cP. In some embodiments, the viscosity of the flowable material may be from 100 cP to 1500 cP. In some embodiments, the viscosity of the flowable material may be from 100 cP to 1000 cP. In some embodiments, the viscosity may be measured according to ASTM D4402 using a #31 spindle at 400° F.

In some embodiments, the viscosity of the flowable material may be from 150 cP to 10000 cP. In some embodiments, the viscosity of the flowable material may be from 200 cP to 10000 cP. In some embodiments, the viscosity of the flowable material may be from 200 cP to 2000 cP. In some embodiments, the viscosity of the flowable material may be from 250 cP to 10000 cP. In some embodiments, the viscosity of the flowable material may be from 300 cP to 10000 cP. In some embodiments, the viscosity of the flowable material may be from 350 cP to 10000 cP. In some embodiments, the viscosity of the flowable material may be from 400 cP to 10000 cP. In some embodiments, the viscosity of the flowable material may be from 450 cP to 10000 cP. In some embodiments, the viscosity of the flowable material may be from 500 cP to 10000 cP. In some embodiments, the viscosity of the flowable material may be from 550 cP to 10000 cP. In some embodiments, the viscosity of the flowable material may be from 600 cP to 10000 cP. In some embodiments, the viscosity of the flowable material may be from 650 cP to 10000 cP. In some embodiments, the viscosity of the flowable material may be from 700 cP to 10000 cP. In some embodiments, the viscosity of the flowable material may be from 750 cP to 10000 cP. In some embodiments, the viscosity of the flowable material may be from 800 cP to 10000 cP. In some embodiments, the viscosity of the flowable material may be from 850 cP to 10000 cP. In some embodiments, the viscosity of the flowable material may be from 900 cP to 10000 cP. In some embodiments, the viscosity of the flowable material may be from 950 cP to 10000 cP. In some embodiments, the viscosity of the flowable material may be from 1000 cP to 10000 cP. In some embodiments, the viscosity of the flowable material may be from 1500 cP to 10000 cP. In some embodiments, the viscosity of the flowable material may be from 2000 cP to 10000 cP. In some embodiments, the viscosity of the flowable material may be from 2500 cP to 10000 cP. In some embodiments, the viscosity of the flowable material may be from 3000 cP to 10000 cP. In some embodiments, the viscosity of the flowable material may be from 3500 cP to 10000 cP. In some embodiments, the viscosity of the flowable material may be from 4000 cP to 10000 cP. In some embodiments, the viscosity of the flowable material may be from 4500 cP to 10000 cP. In some embodiments, the viscosity of the flowable material may be from 5000 cP to 10000 cP. In some embodiments, the viscosity of the flowable material may be from 5500 cP to 10000 cP. In some embodiments, the viscosity of the flowable material may be from 6000 cP to 10000 cP. In some embodiments, the viscosity of the flowable material may be from 6500 cP to 10000 cP. In some embodiments, the viscosity of the flowable material may be from 7000 cP to 10000 cP. In some embodiments, the viscosity of the flowable material may be from 7500 cP to 10000 cP. In some embodiments, the viscosity of the flowable material may be from 8000 cP to 10000 cP. In some embodiments, the viscosity may be measured according to ASTM D4402 using a #31 spindle at 400° F.

In some embodiments, the viscosity of the flowable material may be from 25 cP to 5000 cP. In some embodiments, the viscosity of the flowable material may be from 25 cP to 4000 cP. In some embodiments, the viscosity of the flowable material may be from 25 cP to 3000 cP. In some embodiments, the viscosity of the flowable material may be from 25 cP to 2000 cP. In some embodiments, the viscosity of the flowable material may be from 25 cP to 1000 cP. In some embodiments, the viscosity of the flowable material may be from 100 cP to 5000 cP. In some embodiments, the viscosity of the flowable material may be from 1000 cP to 5000 cP. In some embodiments, the viscosity of the flowable material may be from 2000 cP to 5000 cP. In some embodiments, the viscosity of the flowable material may be from 3000 cP to 5000 cP. In some embodiments, the viscosity of the flowable material may be from 4000 cP to 5000 cP. In some embodiments, the viscosity of the flowable material exceeds the detectable limits of the viscosity measuring instrument. In some embodiments, the viscosity may be measured according to ASTM D4402 using a #31 spindle at 400° F.

Step 512 may comprise, consist of, or consist essentially of applying the flowable material to a roofing substrate. In some embodiments, the applying may comprise, consist of, or consist essentially of at least one of depositing, pouring, coating, rolling, placing, dipping, or any combination thereof. In some embodiments, the flowable material is applied to the roofing substrate on a substantially standard manufacturing line for asphalt shingles at a standard speed of 110 feet per minute (FPM) to 1000 FPM. In some embodiments, the standard speed is 200 FPM to 1000 FPM. In some embodiments, the standard speed is 300 FPM to 1000 FPM. In some embodiments, the standard speed is 400 FPM to 1000 FPM. In some embodiments, the standard speed is 500 FPM to 1000 FPM. In some embodiments, the standard speed is 600 FPM to 1000 FPM. In some embodiments, the standard speed is 700 FPM to 1000 FPM. In some embodiments, the standard speed is 800 FPM to 1000 FPM. In some embodiments, the standard speed is 900 FPM to 1000 FPM. In some embodiments, the standard speed is 200 FPM to 900 FPM. In some embodiments, the standard speed is 200 FPM to 800 FPM. In some embodiments, the standard speed is 200 FPM to 700 FPM. In some embodiments, the standard speed is 200 FPM to 600 FPM. In some embodiments, the standard speed is 200 FPM to 500 FPM. In some embodiments, the standard speed is 200 FPM to 400 FPM. In some embodiments, the standard speed is 200 FPM to 300 FPM.

Step 514 may comprise, consist of, or consist essentially of curing the flowable material to obtain a coating on the roofing substrate. In some embodiments, the curing is sufficient for the crosslinking agent to react with one of the polymer A or the polymer B. In some embodiments, the curing comprises exposing the flowable material to ambient (e.g., ambient conditions). In some embodiments, the curing comprises exposing the flowable material to moisture. In some embodiments, the curing comprises exposing the flowable material to heat. In some embodiments, the curing comprises exposing the flowable material to radiation. In some embodiments, the curing comprising exposing or providing in a presence of a catalyst (e.g., a curing catalyst). In some embodiments, the curing comprises exposing the flowable material to a curing temperature (e.g., heating). In some embodiments, the curing comprises exposing the flowable material to light (e.g., visible light, ultraviolet light, infrared light, etc.). In some embodiments, the curing step may not be performed in the method 500. For example, in some embodiments, the curing step may not be performed where one of the polymeric material A or the polymeric material B is synthesized in the presence of at least the other polymeric material. In some embodiments, the curing comprises synthesizing the polymeric material A in the presence of at least one of the polymeric material B, the at least one filler, or any combination thereof. In some embodiments, the curing comprises synthesizing the polymeric material B in the presence of at least one of the polymeric material A, the at least one filler, or any combination thereof. In some embodiments, the curing comprises crosslinking the polymeric material A in the presence of at least one of the polymeric material B, the at least one filler, or any combination thereof. In some embodiments, the curing comprises crosslinking the polymeric material B in the presence of at least one of the polymeric material A, the at least one filler, or any combination thereof.

In some embodiments, the curing may proceed over a curing period. In some embodiments, the curing period is a duration sufficient to permit processing or continued processing of the flowable material (e.g., to obtain a roofing material, a coating on a roofing substrate, a roofing shingle, etc.). In some embodiments, a curing period sufficient to permit processing of the flowable material comprises a sufficiently long curing period such that the flowable material does not prematurely reach a cured state. For example, a cured state may be premature if the flowable material is cured before processing of the flowable material is complete. In some embodiment, the processing of the flowable material may proceed until roofing granules are disposed on a surface of the flowable material. In some embodiments, the processing of the flowable material may proceed until the flowable material is applied to the roofing substrate. In some embodiments, the curing comprises a curing period of at least 5 min. In some embodiments, the curing may comprise, consist of, or consist essentially of a curing period of 5 min to 72 hr. In some embodiments, the curing may comprise, consist of, or consist essentially of a curing period of 5 min to 10 hr. In some embodiments, the curing may comprise, consist of, or consist essentially of a curing period of 5 min to 5 hr. In some embodiments, the curing may comprise, consist of, or consist essentially of a curing period of 5 min to 10 hr. In some embodiments, the curing may comprise, consist of, or consist essentially of a curing period of 30 min to 100 hr. In some embodiments, the curing may comprise, consist of, or consist essentially of a curing period of 20 min to 1 hr.

In some embodiments, at least one of the mixing, the applying, the curing, or any combination thereof may be performed at a temperature of less than 400° F. In some embodiments, at least one of the mixing, the applying, the curing, or any combination thereof may be performed at a temperature of less than 395° F. In some embodiments, at least one of the mixing, the applying, the curing, or any combination thereof may be performed at a temperature of less than 390° F. In some embodiments, at least one of the mixing, the applying, the curing, or any combination thereof may be performed at a temperature of less than 385° F. In some embodiments, at least one of the mixing, the applying, the curing, or any combination thereof may be performed at a temperature of less than 380° F. In some embodiments, at least one of the mixing, the applying, the curing, or any combination thereof may be performed at a temperature of less than 375° F. In some embodiments, at least one of the mixing, the applying, the curing, or any combination thereof may be performed at a temperature of less than 370° F. In some embodiments, at least one of the mixing, the applying, the curing, or any combination thereof may be performed at a temperature of less than 365° F. In some embodiments, at least one of the mixing, the applying, the curing, or any combination thereof may be performed at a temperature of less than 360° F. In some embodiments, at least one of the mixing, the applying, the curing, or any combination thereof may be performed at a temperature of less than 355° F. In some embodiments, at least one of the mixing, the applying, the curing, or any combination thereof may be performed at a temperature of less than 350° F. In some embodiments, at least one of the mixing, the applying, the curing, or any combination thereof may be performed at a temperature of less than 345° F. In some embodiments, at least one of the mixing, the applying, the curing, or any combination thereof may be performed at a temperature of less than 340° F. In some embodiments, at least one of the mixing, the applying, the curing, or any combination thereof may be performed at a temperature of less than 335° F. In some embodiments, at least one of the mixing, the applying, the curing, or any combination thereof may be performed at a temperature of less than 330° F. In some embodiments, at least one of the mixing, the applying, the curing, or any combination thereof may be performed at a temperature of less than 325° F.

In some embodiments, at least one of the mixing, the applying, the curing, or any combination thereof may be performed at a temperature of 300° F. to 400° F. In some embodiments, at least one of the mixing, the applying, the curing, or any combination thereof may be performed at a temperature of 300° F. to 390° F. In some embodiments, at least one of the mixing, the applying, the curing, or any combination thereof may be performed at a temperature of 300° F. to 380° F. In some embodiments, at least one of the mixing, the applying, the curing, or any combination thereof may be performed at a temperature of 300° F. to 370° F. In some embodiments, at least one of the mixing, the applying, the curing, or any combination thereof may be performed at a temperature of 300° F. to 360° F. In some embodiments, at least one of the mixing, the applying, the curing, or any combination thereof may be performed at a temperature of 300° F. to 350° F. In some embodiments, at least one of the mixing, the applying, the curing, or any combination thereof may be performed at a temperature of 300° F. to 340° F. In some embodiments, at least one of the mixing, the applying, the curing, or any combination thereof may be performed at a temperature of 300° F. to 330° F. In some embodiments, at least one of the mixing, the applying, the curing, or any combination thereof may be performed at a temperature of 310° F. to 330° F. In some embodiments, at least one of the mixing, the applying, the curing, or any combination thereof may be performed at a temperature of 315° F. to 330° F. In some embodiments, at least one of the mixing, the applying, the curing, or any combination thereof may be performed at a temperature of 320° F. to 330° F.

In some embodiments, the presence of the polymer network is determined or measured using at least one of small-angle neutron scattering (SANS), Fourier transform IR spectroscopy (FTIR), differential scanning calorimetry (DSC), dynamic mechanical spectroscopy (DMS), transmission electron microscopy (TEM), or any combination thereof.

Example 1

Figure 6:
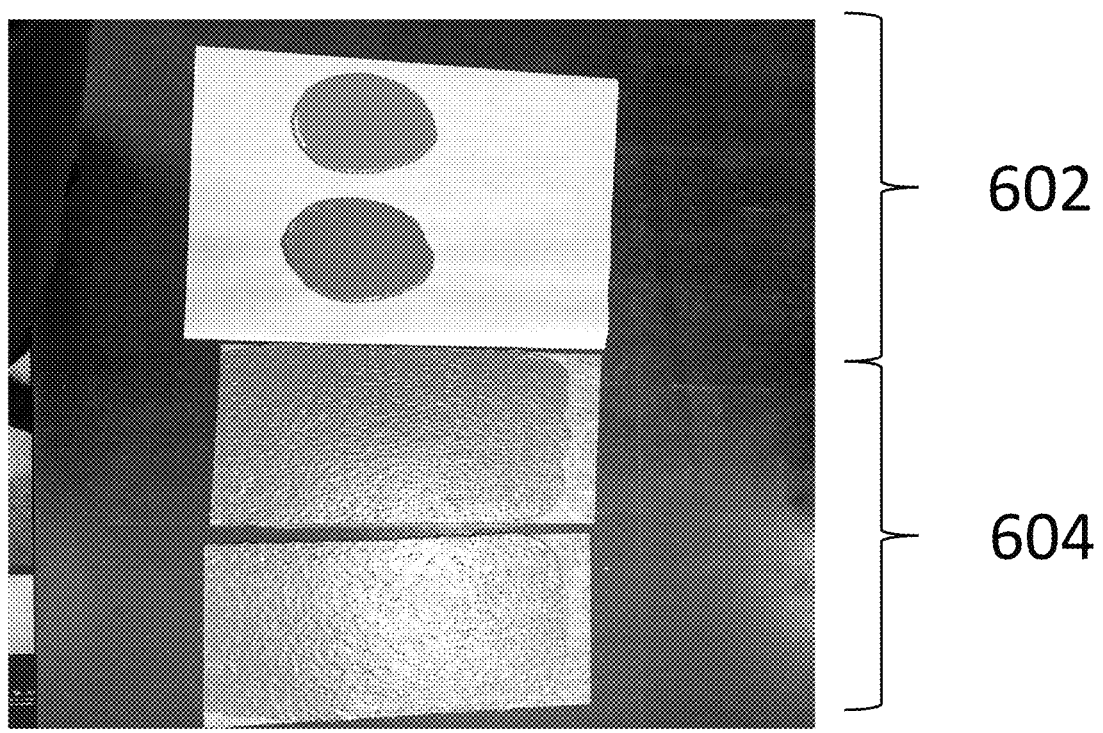
FIG. 6 is an image of a filled coating poured onto a substrate and a filled coating on a glass mat to make coupons, according to some embodiments.
Figure 7:
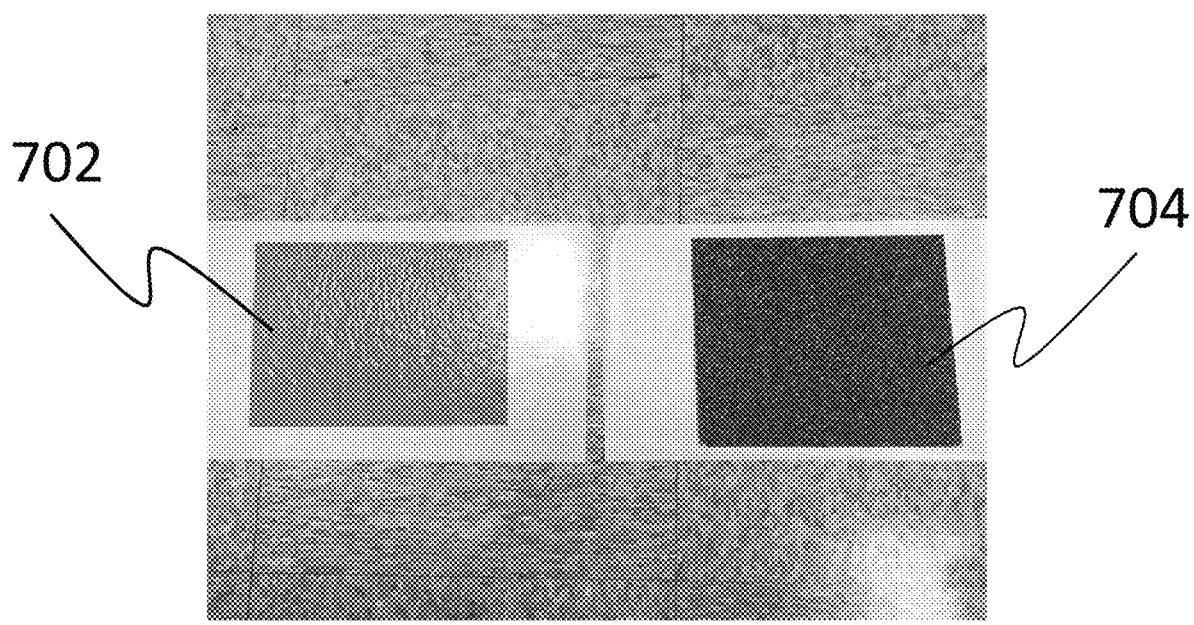
FIG. 7 is an image of a laboratory prepared coupon having the filled coating and a corresponding shinglet prototype having the filled coating, according to some embodiments.
Figure 8:
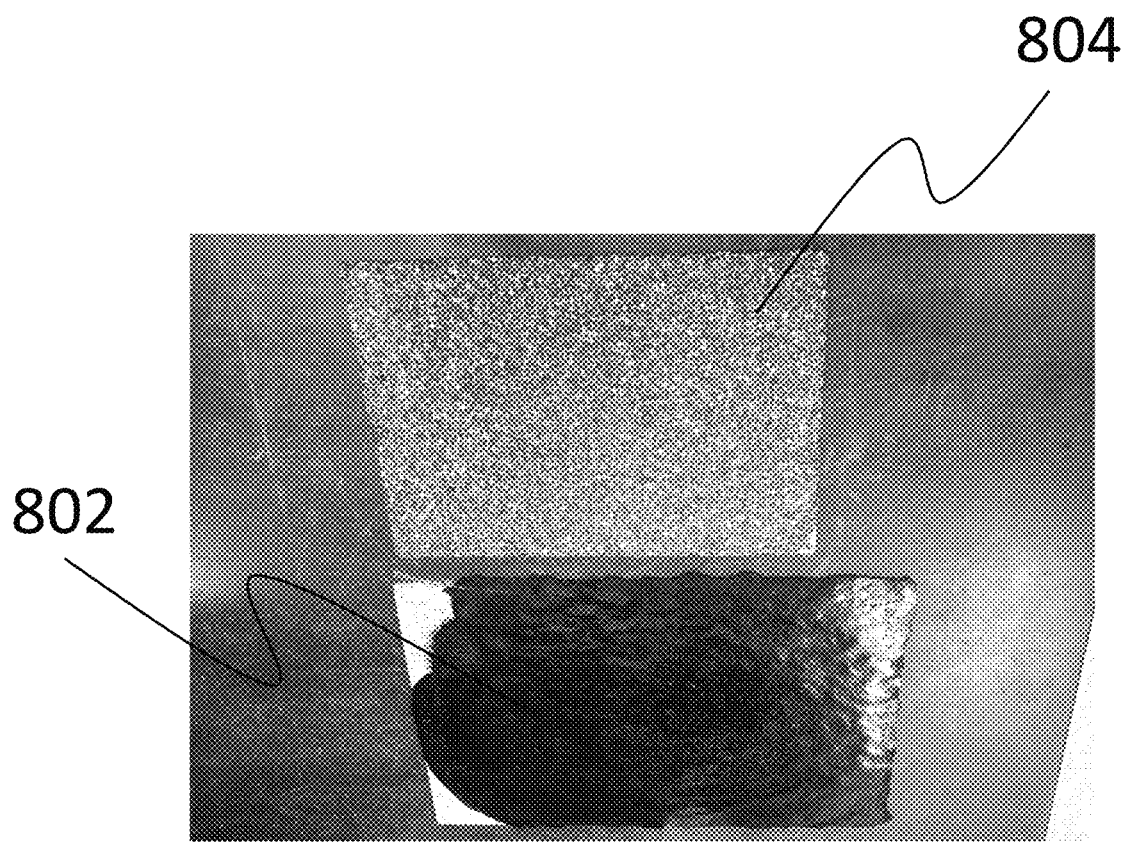
FIG. 8 is an image of a glass mat coated with a coating filled with 50% by weight of recycled shingles and a corresponding lab shingle prototype, according to some embodiments of the present disclosure.

FIG. 6 is an image of a filled coating poured onto a substrate (602) and a filled coating on a glass mat (604) to make coupons, according to some embodiments of the present disclosure. FIG. 7 is an image of a laboratory prepared coupon having the filled coating (702) and a corresponding shinglet prototype having the filled coating (704), according to some embodiments of the present disclosure. FIG. 8 is an image of a glass mat coated with a coating filled with 50% by weight of recycled shingles (802) and a corresponding lab shingle prototype (804), according to some embodiments of the present disclosure.

| Sample | Tear (gf) Cross Machine Direction | Tensile (lbf) Machine Direction |
|---|---|---|
| Glass Mat coated with Filled Control Coating | 1180 | 171 |
| Glass Mat coated with Filled IPN Coating #1 | 1492 | 214 |
| Glass Mat coated with Filled IPN Coating #2 | 1268 | 199 |
| Glass Mat coated with Filled IPN Coating #3 | 1025 | 167 |
| Glass Mat coated with Filled IPN Coating #4 | 1758 | 171 |

Example 2

A polymeric material including 50% by weight of a polyurethane precursor based on a total weight of the polymeric material and 50% by weight of an alpha-polyolefin precursor based on the total weight of the polymeric material is obtained. The polymeric material is mixed with limestone to form a coating which includes 46% by weight of the polymeric material based on a total weight of the coating and 56% by weight of the limestone based on the total weight of the coating. The coating is applied to a roofing substrate to form a roofing shingle. Once cured, the polyurethane and the alpha-olefin form an interpenetrating polymer network, and the polyurethane is crosslinked.

Example 3

A polymeric material including 15% by weight of a polyurethane precursor based on a total weight of the polymeric material and 85% by weight of an amorphous polyethylene precursor based on the total weight of the polymeric material is obtained. The polymeric material is mixed with limestone to form a coating which includes 35% by weight of the polymeric material based on a total weight of the coating and 65% by weight of the limestone based on the total weight of the coating. The coating is applied to a roofing substrate to form a roofing shingle. Once cured, the polyurethane and the amorphous polyethylene form an interpenetrating polymer network, and the polyurethane is crosslinked.

Example 4

A polymeric material including 95% by weight of a polyurethane precursor based on a total weight of the polymeric material and 5% by weight of a re-refined engine oils bottoms (REOB) based on the total weight of the polymeric material is obtained. The polymeric material is mixed with limestone to form a coating which includes 35% by weight of the polymeric material based on a total weight of the coating and 65% by weight of the limestone based on the total weight of the coating. The coating is applied to a roofing substrate to form a roofing shingle. Once cured, the polyurethane and the REOB form an interpenetrating polymer network, and the polyurethane is crosslinked.

Example 5

A polymeric material including 15% by weight of a polyurethane precursor based on a total weight of the polymeric material and 85% by weight of an asphalt based on the total weight of the polymeric material is obtained. The polymeric material is mixed with limestone to form a coating which includes 35% by weight of the polymeric material based on a total weight of the coating and 65% by weight of the limestone based on the total weight of the coating. The coating is applied to a roofing substrate to form a roofing shingle. Once cured, the polyurethane and the asphalt form an interpenetrating polymer network, and the polyurethane is crosslinked.

Example 6

A polymeric material including 75% by weight of a polyurethane precursor based on a total weight of the polymeric material and 25% by weight of an amorphous polyethylene precursor based on the total weight of the polymeric material is obtained. The polymeric material is mixed with limestone to form a coating which includes 35% by weight of the polymeric material based on a total weight of the coating and 65% by weight of the limestone based on the total weight of the coating. The coating is applied to a roofing substrate to form a roofing shingle. Once cured, the polyurethane and the amorphous polyethylene form an interpenetrating polymer network, and the polyurethane is crosslinked.

Example 7

A polymeric material including 50% by weight of a polyurethane precursor based on a total weight of the polymeric material and 50% by weight of a polymethyl methacrylate precursor based on the total weight of the polymeric material is obtained. The polymeric material is mixed with limestone to form a coating which includes 35% by weight of the polymeric material based on a total weight of the coating and 65% by weight of the limestone based on the total weight of the coating. The coating is applied to a roofing substrate to form a roofing shingle. Once cured, the polyurethane and the polymethyl methacrylate form an interpenetrating polymer network, and the polyurethane and the polymethyl methacrylate are both crosslinked.

What is claimed is:

1. A roofing shingle comprising:
   a substrate;
      wherein the substrate comprises at least one of a scrim, a fiberglass mat, a fabric, a glass mat, or any combination thereof; and
   a coating on the substrate,
      wherein the coating comprises:
         5% to 98% by weight of a polymeric material based on a total weight of the coating,
            wherein the polymeric material comprises a polymer A and a polymer B,
            wherein the polymer A and the polymer B are different,
            wherein the polymer A is crosslinked,
            wherein the polymer B is not crosslinked,
            wherein the polymer B is not bonded to the polymer A,
            wherein the polymer B is interlaced throughout a polymer network of the polymer A, so as to form an interpenetrating polymer network; and
         2% to 95% by weight of at least one filler based on the total weight of the coating,
      wherein the coating has a thickness of 20 mils to 200 mils;
   wherein the roofing shingle has a Tear CD property of at least 1000 g-f, as measured according to ASTM D1922, as modified by ASTM D228.

2. The roofing shingle of claim 1, wherein the coating comprises 20% to 80% by weight of the polymer A and the polymer B based on the total weight of the coating.

3. The roofing shingle of claim 1, wherein the coating comprises 40% to 80% by weight of the at least one filler based on the total weight of the coating.

4. The roofing shingle of claim 1, wherein the polymeric material comprises 15% to 75% by weight of the polymer A based on a total weight of the polymeric material.

5. The roofing shingle of claim 1, wherein the polymeric material comprises 25% to 85% by weight of the polymer B based on a total weight of the polymeric material.

6. The roofing shingle of claim 1, wherein the polymer A comprises at least one of a polyurethane, an epoxy, a vinyl polymer, an acrylic polymer, a polyisobutylene, an amorphous poly-alpha olefin, a polyolefin, a silicone, a hydrocarbon oil, a resin, or any combination thereof.

7. The roofing shingle of claim 1, wherein the polymer B comprises at least one of a polyurethane, an epoxy, a vinyl polymer, an acrylic polymer, a polyisobutylene, an amorphous poly-alpha olefin, a polyolefin, a silicone, a hydrocarbon oil, a resin, or any combination thereof.

8. The roofing shingle of claim 1, wherein the roofing shingle has a Tear CD property of 1000 g-f to 5000 g-f, as measured according to ASTM D1922, as modified by ASTM D228.

9. The roofing shingle of claim 1, wherein the coating directly contacts the substrate.

10. The roofing shingle of claim 1, wherein the coating comprises:
    30% to 70% by weight of the polymeric material based on the total weight of the coating; and
    40% to 80% by weight of the at least one filler based on the total weight of the coating.

11. A roofing system comprising:
    a roofing substrate; and
    a plurality of roofing shingles on the roofing substrate, each roofing shingle of the plurality of roofing shingles comprising:
        a substrate,
            wherein the substrate comprises at least one of a scrim, a fiberglass mat, a fabric, a glass mat, or any combination thereof; and
        a coating on the substrate,
            wherein the coating comprises:
                5% to 98% by weight of a polymeric material based on a total weight of the coating,
                    wherein the polymeric material comprises a polymer A and a polymer B,
                    wherein the polymer A and the polymer B are different,
                    wherein the polymer A is crosslinked,
                    wherein the polymer B is not crosslinked,
                    wherein the polymer B is not bonded to the polymer A,
                    wherein the polymer B is interlaced throughout a polymer network of the polymer A, so as to form an interpenetrating polymer network; and
                2% to 95% by weight of at least one filler based on the total weight of the coating,
            wherein the coating has a thickness of 20 mils to 200 mils;
        wherein each roofing shingle of the plurality of roofing shingles has a Tear CD property of at least 1000 g-f, as measured according to ASTM D1922, as modified by ASTM D228.

12. The roofing system of claim 11, wherein the coating comprises 20% to 80% by weight of the polymer A and the polymer B based on the total weight of the coating.

13. The roofing system of claim 11, wherein the coating comprises 40% to 80% by weight of the at least one filler based on the total weight of the coating.

14. The roofing system of claim 11, wherein the polymeric material comprises 15% to 75% by weight of the polymer A based on a total weight of the polymeric material.

15. The roofing system of claim 11, wherein the polymeric material comprises 25% to 85% by weight of the polymer B based on a total weight of the polymeric material.

16. The roofing system of claim 11, wherein the polymer A comprises at least one of a polyurethane, an epoxy, a vinyl polymer, an acrylic polymer, a polyisobutylene, an amorphous poly-alpha olefin, a polyolefin, a silicone, a hydrocarbon oil, a resin, or any combination thereof.

17. The roofing system of claim 11, wherein the polymer B comprises at least one of a polyurethane, an epoxy, a vinyl polymer, an acrylic polymer, a polyisobutylene, an amorphous poly-alpha olefin, a polyolefin, a silicone, a hydrocarbon oil, a resin, or any combination thereof.

18. The roofing system of claim 11, wherein each roofing shingle of the plurality of roofing shingles has a Tear CD property of 1000 g-f to 5000 g-f, as measured according to ASTM D1922, as modified by ASTM D228.

19. The roofing system of claim 11, wherein the coating directly contacts the substrate.

20. The roofing system of claim 11, wherein the coating comprises:
    30% to 70% by weight of the polymeric material based on the total weight of the coating; and
    40% to 80% by weight of the at least one filler based on the total weight of the coating.

* * * * *